(12) United States Patent
Kusukame et al.

(10) Patent No.: US 8,993,919 B2
(45) Date of Patent: Mar. 31, 2015

(54) LASER SOURCE AND LASER BEAM MACHINE

(75) Inventors: Koichi Kusukame, Nara (JP); Shinichi Kadowaki, Fukuoka (JP); Hiroyuki Furuya, Kumamoto (JP); Kiminori Mizuuchi, Ehime (JP); Susumu Takagi, Ehime (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 398 days.

(21) Appl. No.: 13/641,986

(22) PCT Filed: Apr. 13, 2011

(86) PCT No.: PCT/JP2011/002187
§ 371 (c)(1),
(2), (4) Date: Oct. 18, 2012

(87) PCT Pub. No.: WO2011/132385
PCT Pub. Date: Oct. 27, 2011

(65) Prior Publication Data
US 2013/0032581 A1    Feb. 7, 2013

(30) Foreign Application Priority Data
Apr. 20, 2010 (JP) .................................. 2010-096789

(51) Int. Cl.
*B23K 26/06* (2014.01)
*H01S 3/06* (2006.01)
(Continued)

(52) U.S. Cl.
CPC ............... *B23K 26/063* (2013.01); *B23K 26/06* (2013.01); *B23K 26/0815* (2013.01); *G02F 1/3511* (2013.01); *G02F 1/353* (2013.01); *H01S 3/06712* (2013.01); *H01S 3/06716* (2013.01); *H01S 3/0675* (2013.01); *H01S 3/1024* (2013.01); *H01S 3/1618* (2013.01); *H01S 3/0092* (2013.01)
USPC .......................................... 219/121.61; 372/6

(58) Field of Classification Search
CPC ................................... B23K 26/06; H01S 3/06
USPC ............................. 219/121.61–121.75; 372/6
See application file for complete search history.

(56) References Cited

U.S. PATENT DOCUMENTS 4,522,656 A    6/1985   Kuhn-Kuhnenfeld et al.
6,327,278 B1 *  12/2001   Toscheck et al. ................. 372/6
(Continued)

FOREIGN PATENT DOCUMENTS

JP    60-37716    2/1985
JP    2-87587    3/1990
(Continued)

OTHER PUBLICATIONS

International Search Report issued Jul. 12, 2011 in International (PCT) Application No. PCT/JP2011/002187.
(Continued)

*Primary Examiner* — Samuel M Heinrich
(74) *Attorney, Agent, or Firm* — Wenderoth, Lind & Ponack, L.L.P.

(57) ABSTRACT

The present application discloses a laser source for emitting laser light onto a work-piece. The laser source includes a generator configured to generate the laser light, and an adjuster configured to adjust an output of the laser light. The adjuster situated between the generator and the work-piece reduces output density of the laser light on the work-piece.

14 Claims, 24 Drawing Sheets

(51) Int. Cl.
*B23K 26/08* (2014.01)
*G02F 1/35* (2006.01)
*H01S 3/102* (2006.01)
*H01S 3/067* (2006.01)
*H01S 3/16* (2006.01)
*H01S 3/00* (2006.01)

(56) References Cited

U.S. PATENT DOCUMENTS

| | | |
|---|---|---|
| 7,692,848 B2 | 4/2010 | Furuya et al. |
| 8,144,391 B2 | 3/2012 | Kusukame et al. |
| 2004/0061149 A1 | 4/2004 | Jyumonji et al. |
| 2005/0145845 A1 | 7/2005 | Jyumonji et al. |
| 2007/0096103 A1 | 5/2007 | Jyumonji et al. |
| 2009/0046749 A1 | 2/2009 | Mizuuchi |
| 2009/0279017 A1 | 11/2009 | Furuya et al. |
| 2010/0118535 A1 | 5/2010 | Kusukame et al. |
| 2010/0195191 A1 | 8/2010 | Kusukame et al. |

FOREIGN PATENT DOCUMENTS

| | | |
|---|---|---|
| JP | 2-299216 | 12/1990 |
| JP | 8-146474 | 6/1996 |
| JP | 2000-223382 | 8/2000 |
| JP | 2004-336013 | 11/2004 |
| JP | 2005-174993 | 6/2005 |
| JP | 2006-330518 | 12/2006 |
| JP | 2007-95936 | 4/2007 |
| JP | 2007-123419 | 5/2007 |
| JP | 2007-142380 | 6/2007 |
| JP | 2008-112773 | 5/2008 |
| WO | 2006/013890 | 2/2006 |
| WO | 2007/043560 | 4/2007 |
| WO | 2009/031278 | 3/2009 |
| WO | 2009/104392 | 8/2009 |

OTHER PUBLICATIONS

Manoranjan P. Singh et al., "Analysis of the Performance of a Thermal Defocusing Optical Limiter in the Transient Regime", IEEE Journal of Quantum Electronics, vol. 34, No. 10, Oct. 1998.

Vladimir Osipov et al., "Intracavity laser processing of reflecting surfaces", Proceedings of SPIE, vol. 5121 (2003).

* cited by examiner

LASER SOURCE AND LASER BEAM MACHINE

TECHNICAL FIELD

The present invention relates to a laser source, which generates laser light, and a laser beam machine equipped with the laser source.

BACKGROUND ART

Laser oscillators or laser systems are used for various machining technologies such as fine laser machining, laser welding, laser marking and laser cutting. In particular, machining technologies such as a laser stepper, laser annealing, laser repair and laser dicing are exemplified as laser machining for semiconductors.

For example, Patent Document 1 discloses a manufacturing method for solar battery panels. According to the disclosure in Patent Document 1, laser annealing is used to manufacture the solar battery panels and crystallize non-crystalline silicon thin films. Accordingly, thin and light solar battery panels which efficiently generate electricity are inexpensively manufactured.

In general, various and strict manufacturing conditions are set for each of a series of steps for manufacturing semiconductors. Marks such as numbers, letters or barcodes are engraved in a dot format (dot marking) on a part of a semiconductor wafer surface in order to manage these manufacturing conditions for semiconductors.

In general, a semiconductor is manufactured through 100 or more steps. Processes for forming multiple elements and leveling the elements are carried out in each of the steps. These processes include various steps such as resist application, reduced projection of patterns onto the resist, and development of the resist, and leveling by various film formation steps (e.g., to form insulating films or metal films) to fill in gaps caused by copper wiring and the resist development.

FIG. 26 is a schematic view of a conventional laser beam machine for engraving marks in a dot format. The conventional laser beam machine is described with reference to FIG. 26.

The laser beam machine 900 in FIG. 26 irradiates continuous pulsed laser light onto a part of a surface of a semiconductor wafer WF to engrave marks in a dot format. The laser beam machine 900 includes a laser source 910, which emits laser light LB, and a scanning mirror 920, which reflects the laser light LB. The scanning mirror 920 reflects the laser light LB emitted from the laser source 910 towards the semiconductor wafer WF. Accordingly, the laser light LB is irradiated onto the semiconductor wafer WF.

FIG. 26 shows the X, Y and Z axes, which define a three-dimensional orthogonal coordinate system. The scanning mirror 920 rotates to move an irradiation position of the laser light LB in the Y axis direction.

The laser beam machine 900 also includes a stage 930 which supports the semiconductor wafer WF. The stage 930 moves the semiconductor wafer WF in the X axis direction. Accordingly, the irradiation position of the laser light LB on the semiconductor wafer WF is also moved in the X axis direction.

The laser source 910 oscillates pulses of the laser light LB. As a result of irradiating the laser light LB onto the semiconductor wafer WF at desired irradiation positions, a desired pattern is marked on a surface (hereinafter, called "work surface") of the semiconductor wafer WF. In general, a solid laser source such as an Nd:YAG laser source or an Nd:YVO$_4$ laser source is widely used as the laser source 910.

Patent Document 2 discloses technologies for reading out dot marks on a semiconductor wafer. According to the disclosure in Patent Document 2, a laser beam is irradiated from a He—Ne laser source onto a semiconductor wafer which is subjected to dot marking. Information indicated by the dot markings is read out on the basis of a reflectivity variation on the semiconductor wafer. Alternatively, a laser beam may be irradiated from a general laser source onto a semiconductor wafer which is subjected to dot markings. The information indicated by the dot markings may be read out on the basis of an oscillation variation of a heat wave caused by the laser beam.

Various manufacturing conditions are set for subsequent semiconductor manufacturing steps, on the basis of the read information from the dot markings. Unless the information in the dot markings is correctly read out (e.g., incorrect information is read from the dot markings), the semiconductor is handled as a defective product.

In many cases, reading errors in dot markings result from burred marks engraved by the aforementioned dot marking step. The burred marks may result from a form of the dots which constitute the marks. In general, a depth of the dots greatly affects clarity of the marks.

Patent Document 3 discloses technologies for obtaining dots of a prescribed height. According to the disclosure in Patent Document 3, a laser beam which has relatively high energy is irradiated once to melt and remove a part of a semiconductor in a spot shape so that a dot is formed. However, the disclosed technologies in Patent Document 3 may cause thick accumulation of molten materials after the melt and removal or scattered and deposited molten materials around the dot. Consequently, there may be a risk of impossible formation of elements, or elements may have worse quality.

Patent Document 4 discloses a laser marking method for engraving dots which have excellent visibility with little dust. According to the technologies disclosed in Patent Document 4, a swelled portion is formed at the center of a dot while a recess is formed around the swelled portion. Accordingly, the dot markings may achieve excellent visibility.

However, a conventional laser beam machine which carries out laser machining such as laser marking or laser annealing has various problems caused by a laser output variation of the laser source. Abrasion on a work-piece may result from the laser output of the laser source. The abrasion on the work-piece may result in dust as well as unclear markings. Consequently, processing errors may occur during subsequent processes.

Patent Document 1: JP 2008-112773 A
Patent Document 2: JP H2-299216 A
Patent Document 3: JP S60-37716 A
Patent Document 4: JP 2000-223382 A

SUMMARY OF THE INVENTION

The object of the present invention is to provide a laser source and a laser beam machine which stably performs desirable machining processes with little abrasion.

A laser source for emitting laser light onto a work-piece according to one aspect of the present invention includes: a generator configured to generate the laser light; and an adjuster configured to adjust an output of the laser light. The adjuster situated between the generator and the work-piece reduces output density of the laser light on the work-piece.

A laser beam machine according to another aspect of the present invention includes: the aforementioned laser source; a scanning optical system which moves an irradiation position of the laser light emitted from the laser source to scan a surface of the work-piece; and a stage on which the work-piece is placed. the stage moves the work-piece. The laser source causes pulse-oscillation.

A laser beam machine according to yet another aspect of the present invention includes: the aforementioned laser source; a smoothing element configured to make a light intensity distribution smooth in a perpendicular plane to a propagation direction of the laser light emitted from the laser source; a spatial modulator configured to change the light intensity distribution in the perpendicular plane; and an optical system configured to guide the laser light, which has the light intensity distribution changed by the spatial modulator, to the work-piece. The laser source causes pulse-oscillation.

A laser beam machine according to yet another aspect of the present invention includes: the aforementioned laser source; a smoothing element configured to make a light intensity distribution smooth in a perpendicular plane to a propagation direction of the laser light emitted from the laser source; a spatial modulator configured to change the light intensity distribution in the perpendicular plane; an optical system configured to guide the laser light, which has the light intensity distribution changed by the spatial modulator, to the work-piece; and an aperture element on which an aperture is formed. The laser source causes pulse-oscillation. The aperture element is situated between the laser source and the smoothing element.

The laser beam machine for machining a work-piece by means of laser light according to yet another aspect of the present invention includes: a resonator with at least two reflecting surfaces; a laser crystal configured to cause laser oscillation by means of stimulated emission; and a displacement mechanism configured to relatively displace the work-piece situated inside the resonator with respect to the resonator.

DETAILED DESCRIPTION OF THE INVENTION

Figure 1:
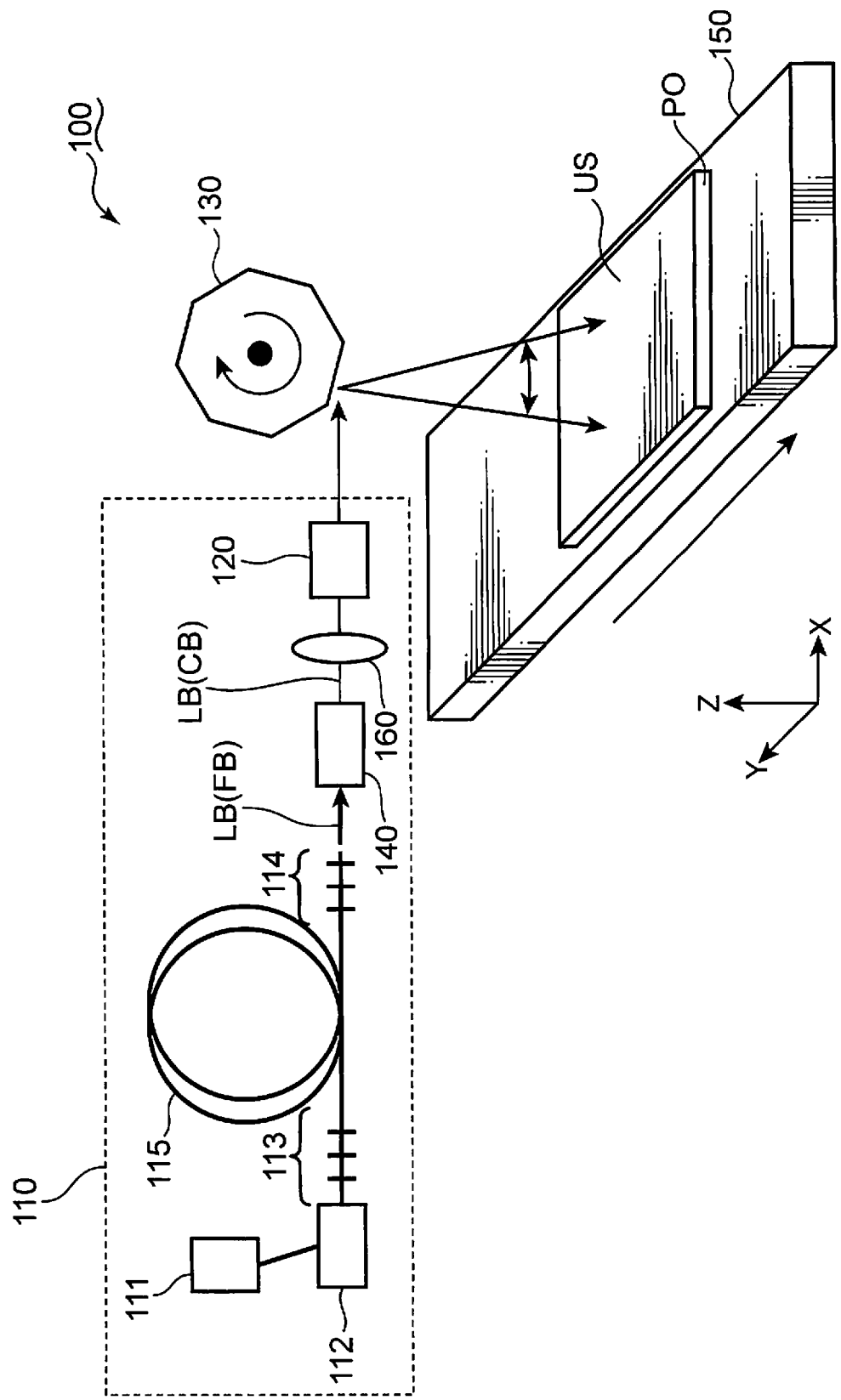
FIG. 1 is a schematic view of a laser beam machine according to the first embodiment.

A laser source and a laser beam machine according to various embodiments are described below with reference to the drawings. In the drawings, the same reference numerals are applied to constituent elements which perform the same or similar actions or operations. In order to avoid redundant descriptions, repetitive explanations are omitted as appropriate. The constituent elements are schematically depicted in the drawings in order to make principles of a series of embodiments easily understood. Consequently, shapes of the constituent elements shown in the drawings are schematic and do not limit in any way the principles of the following embodiments.

First Embodiment

FIG. 1 is a schematic view of a laser beam machine according to the first embodiment. The laser beam machine is described with reference to FIG. 1.

The laser beam machine 100 shown in FIG. 1 includes a laser source 110, a scanning mirror 130 and a stage 150. A work-piece PO is placed on the stage 150. The laser source 110 irradiates laser light LB towards the scanning mirror 130. The scanning mirror 130 reflects the laser light LB towards the work-piece PO on the stage 150. The laser light LB from the laser source 110 is irradiated onto the work-piece PO.

FIG. 1 shows the X, Y and Z axes which define a three-dimensional orthogonal coordinate system. The stage 150 moves along the Y axis. Accordingly, the work-piece PO moves along the Y axis to determine an irradiation position of the laser light LB in the Y axis direction. The irradiation position of the laser light LB in the X axis direction is determined in response to a rotational angle of the scanning mirror 130. Consequently, the laser light LB scans the upper surface US of the work-piece PO in the X axis direction in response to the rotation of the scanning mirror 130. Therefore, the laser light LB is irradiated onto desirable positions on the upper surface US of the work-piece PO. In the present embodiment, the upper surface US of the work-piece PO is exemplified as the work surface. The scanning mirror 130 is exemplified as the scanning optical system.

The laser source 110 includes a LD power source 111, a pump LD (semiconductor laser apparatus for excitation) 112, fiber gratings 113, 114, a double-clad fiber 115 and an NA converter 120. For example, the double-clad fiber 115 may be a 10 m-long double-clad polarization-maintaining fiber. For example, the double-clad polarization-maintaining fiber may include a core which is doped with the rare-earth "Yb". In the present embodiment, "Yb" which is doped into the core is exemplified as the laser medium. Alternatively, suitable laser active materials may be used to generate laser light.

The LD power source 111 supplies electrical power to the pump LD 112. Consequently, the pump LD 112 emits the pump light. The pump light is then incident on the double-clad fiber 115 via the fiber grating 113. The pump light which is incident on the double-clad fiber 115 excites the laser active medium which is doped into the core of the double-clad fiber 115.

The fiber gratings 113, 114 which are connected to both ends of the double-clad fiber 115, respectively, reflect light, which is generated as a result of the excitation of the laser active medium inside the double-clad fiber 115, to work as a resonator. The light generated inside the double-clad fiber 115 reciprocates back and forth inside the resonator, which is formed by means of the fiber gratings 113, 114, to generate the laser light LB (hereinafter, called "fundamental light wave FB") by stimulated emission. In the present embodiment, the LD power source 111, the pump LD 112, the fiber gratings 113, 114 and the double-clad fiber 115 are exemplified as the generator configured to generate the laser light LB. The fiber gratings 113, 114 are exemplified as at least two reflectors. The LD power source 111 and the pump LD 112 are exemplified as the excitation elements configured to excite the laser medium.

As described above, in the present embodiment, "Yb" is used as laser active materials. Consequently, the fundamental light wave FB having a wavelength from 1050 nm to 1170 nm is excited as desired. The laser light LB in such a wavelength range may be used for various applications such as machining or wavelength conversion. Alternatively, rare earths such as "Er", "Pr", "Nd", "Tm" and "Ho" or an additive including a mixture of these may be used as the laser active materials. Even if rare earths such as "Er", "Pr", "Nd", "Tm" and "Ho" or a mixture of these are doped into the core of a double-clad fiber, a suitable fundamental light wave may be generated. An oscillation wavelength of the generated fundamental light wave changes in response to a type of the doped laser active materials. Consequently, the type of the doped laser active materials may be selected in accordance with a desired oscillation wavelength.

In the present embodiment, three single emitter laser diodes are used as the pump LD 112. For example, each of the three single emitter laser diodes may have the maximum output of 8 W. Pump light with a wavelength of 975 nm is excited from each of the three single emitter laser diodes.

In the present embodiment, a double-clad polarization-maintaining fiber is used for the fiber grating 113. The double-clad polarization-maintaining fiber includes a core, which is doped with germanium, to enhance sensitivity to ultraviolet light. The double-clad polarization-maintaining fiber may have the following characteristics: central wavelength 1064 nm, width at half maximum of reflection spectrum 1 nm, and reflectivity 98%.

In the present embodiment, a general single-mode polarization-maintaining fiber (core diameter: 9 μm, cladding outer diameter: 125 μm) is used for the fiber grating 114. Like the fiber grating 113, the core of the single-mode polarization-maintaining fiber is doped with germanium. The single-mode polarization-maintaining fiber may have the following characteristics: central wavelength 1064 nm, width at half maximum of reflection spectrum 0.05 nm, and reflectivity 10% to 15%.

The fundamental light wave FB which is generated by the aforementioned laser resonator is single-mode (Gaussian beam) laser light LB with a central wavelength of 1064 nm.

In the present embodiment, the LD power source 111 pulse-modulates a current applied to the pump LD 112. Accordingly, the aforementioned laser resonator may repeatedly generate pulses of the fundamental light wave FB. In the present embodiment, the current applied to the pump LD 112 is exemplified as the energy for exciting the laser medium.

Figure 2:
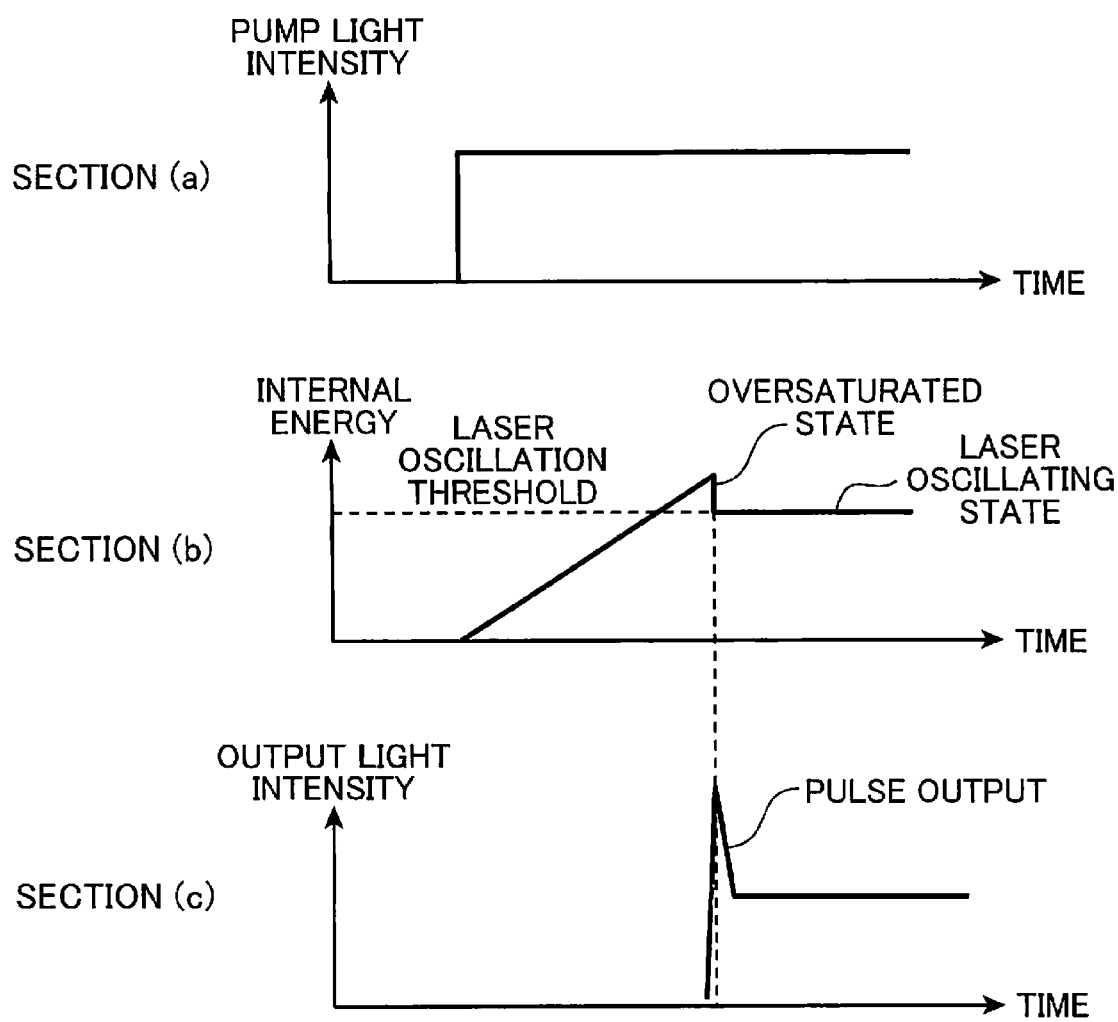
FIG. 2 is graphs schematically showing a relationship among intensity of pump light, internal energy of a double-clad fiber and intensity of a fundamental light wave.

FIG. 2 is graphs schematically showing a relationship among intensity of the pump light, internal energy of the double-clad fiber 115 and intensity of the fundamental light wave FB. A series of the graphs shown in FIG. 2 represent principles of pulse generation by gain switching. A method of pulse oscillation by the laser source 110 is described with reference to FIGS. 1 and 2.

Section (a) in FIG. 2 is a schematic graph showing a temporal variation in intensity of the pump light emitted from the pump LD 112. In the present embodiment, the pump LD 112 emits the pump light which is intensity-modulated in a step shape.

Section (b) in FIG. 2 is a schematic graph showing a resultant temporal variation in internal energy of the core of the double-clad fiber 115 from a variation in the intensity of the pump light. The internal energy of the core of the double-clad fiber 115 which is doped with "Yb" (laser active material) increases with time from the incidence of the pump light which shows a stepwise change in the intensity. Unless the laser active materials in the core of the double-clad fiber 115 are in an oscillating state, the internal energy exceeds the laser oscillation threshold and becomes an oversaturated state.

Section (c) in FIG. 2 is a schematic graph showing a variation in output intensity of the laser light LB. If laser oscillation starts while the internal energy of the double-clad fiber 115 is in the oversaturated state, all the energy accumulated inside the double-clad fiber 115 is radiated at the same time. Therefore, a pulse of the output laser light LB is generated as shown by section (c) in FIG. 2.

The pump light described with reference to FIG. 2 is laser light having a wavelength of 975 nm which is emitted from the pump LD 112. The fundamental light wave FB is laser light LB having a central wavelength of 1064 nm which oscillates in a resonator constituted by the fiber gratings 113, 114.

A laser marking method by means of the laser light LB emitted from the laser source 110 is described with further reference to FIG. 1.

As described above, the laser source 110 emits the laser light LB towards the scanning mirror 130. The scanning mirror 130 reflects the laser light LB towards the work-piece PO. Accordingly, the laser light LB is irradiated onto the work-piece PO. The scanning mirror 130 rotates and changes the reflection direction of the laser light LB along the X axis. In the present embodiment, a semiconductor wafer is exemplified as the work-piece PO.

As described above, the work-piece PO is placed onto the stage 150. The stage 150 moves the work-piece PO in the Y axis direction. Accordingly, the irradiation position of the laser light LB changes in the Y axis direction as well as the X axis direction. Therefore, a desirable irradiation position of the laser light LB is set by the scanning mirror 130 and the stage 150.

If desirable irradiation positions of the laser light LB are set while the laser source 110 generates pulses, a desirable pattern is marked on the upper surface US of the work-piece PO.

The laser source 110 further includes a wavelength conversion module 140 which converts a wavelength of the fundamental light wave FB emitted from the fiber grating 114. In this case, even if the semiconductor wafer, which is exemplified as the work-piece PO, is a very absorptive material for visible light, such as a silicon (c-Si) wafer, suitable marking processes may be achieved with low power consumption. In the present embodiment, the wavelength conversion module 140 is exemplified as the wavelength convertor.

The laser source 110 also includes a condensing lens 160 which is situated between the wavelength conversion module 140 and the NA converter 120. The wavelength conversion module 140 converts the fundamental light wave FB into the laser light LB, which has a shorter wavelength than the fundamental light wave FB. Consequently the condensing lens 160 may improve light condensing characteristics of the laser light LB. Therefore, finer markings may be engraved. In the following description, the converted laser light LB by means of the wavelength conversion module 140 is called "converted light CB".

It may be more preferable that the wavelength conversion module 140 converts the fundamental light wave FB into the second harmonic light wave of the fundamental light wave FB (converted light CB: green laser light having a central wavelength of 532 nm). Accordingly, the laser beam machine 100 may engrave markings with even lower power consumption.

A quasi-phase matched wavelength conversion element may be used as the wavelength conversion module 140. The quasi-phase matched wavelength conversion element is formed, for example, by providing a polarization reversed structure having a period of approximately 7 μm on $LiNbO_3$ (MgLN) doped with Mg. The wavelength conversion module 140 which uses such a quasi-phase matched wavelength conversion element may appropriately convert the fundamental light wave FB into the second harmonic light wave (converted light CB).

Figure 3:
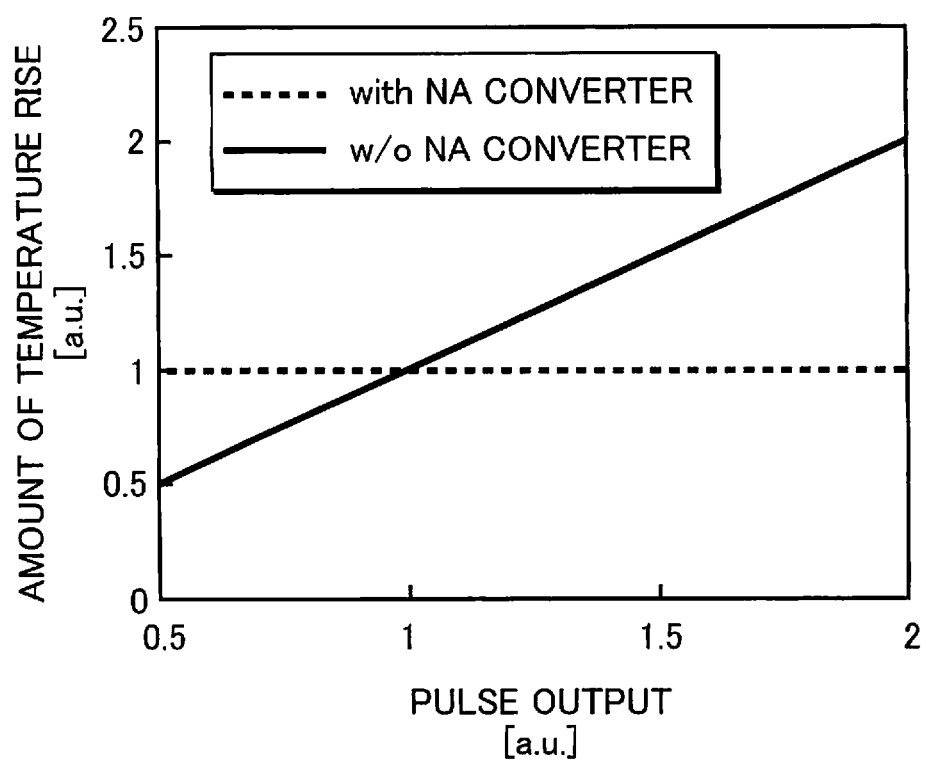
FIG. 3 is a graph schematically showing advantageous effects from an NA converter which is used as the NA converting portion.

FIG. 3 is a graph schematically showing advantageous effects of the NA converter 120 which is used as the NA converting portion. The NA converter 120 is described with reference to FIGS. 1 and 3.

As described above, the fundamental light wave FB emitted from the fiber grating 114 is converted into the converted light CB by the wavelength conversion module 140. The condensing lens 160 then condenses the converted light CB onto the NA converter 120. The NA converter 120 situated between the condensing lens 160 and the scanning mirror 130, which reflects the converted light CB onto the upper surface US of the work-piece PO, changes an NA (laser light spread angle) of the laser light LB (the converted light CB) in response to the pulse output, so as to lower the output of the converted light CB on the upper surface US of the work-piece PO. In the present embodiment, the NA converter 120 is exemplified as the adjuster configured to adjust output density of the laser light LB.

The NA converter 120 situated on the optical path of the laser light LB includes a crystal of which the lens effect (condensing effect) changes in response to the output of the laser light LB transmitted through the NA converter 120. Due to the change in the lens effect, the greater the pulse output, the larger the beam diameter on the upper surface US of the work-piece PO. Accordingly, the output of the laser light LB is appropriately reduced on the work-piece PO.

FIG. 3 shows a relationship between a pulse output of the laser light and a temperature rise in an irradiation region of the laser light. Data indicated by the solid line in the graph of FIG. 3 represent a temperature rise without NA converter. Data indicated by the dotted line in the graph of FIG. 3 represent a temperature rise under irradiation of the laser light onto the irradiation region via the NA converter.

If the laser light is irradiated onto the irradiation region without transmission through the NA converter, a beam diameter on the irradiation region is substantially consistent, independently from a variation in the pulse output. Consequently, as shown by the solid data line in FIG. 3, an increase amount of the central temperature of the irradiation region of the laser light goes up as the pulse output increases.

If the NA converter is designed so that a change in the beam diameter on the irradiation region becomes proportional to a square root of the pulse output, as indicated by the dotted data line in FIG. 3, the temperature rise amount in the irradiation region of the laser light (an increase amount of the maximum temperature) is substantially consistent, independently from the variation in the pulse output. If the NA converter 120 of the laser source 110 according to the present embodiment has the characteristics indicated by the dotted data line in FIG. 3, the resultant variation in the temperature rise amount from the variation in the pulse output is likely to decrease on the upper surface US of the work-piece PO.

A crystal having a thermal lens effect may be exemplified as the NA converter 120. The crystal used for the NA converter 120 absorbs a part of the incident laser light LB to make a temperature distribution uneven in the optical path of the laser light LB inside the crystal. A refractive index distribution corresponding to the uneven temperature distribution may be obtained.

If a crystal having a "positive" change rate of the refractive index with respect to temperature is used as the NA converter 120, the laser light LB is condensed. If a crystal having a "negative" change rate of the refractive index with respect to temperature is used as the NA converter 120, the laser light LB is diffused. Therefore, a beam diameter on the upper surface US of the work-piece PO varies with the pulse output.

Alternatively, a crystal which causes Kerr effect or Pockels effect to change the refractive index with the light intensity may be used as the NA converter 120. Since the self-condensing effects or self-diffusing effects vary with the pulse output, a beam diameter varies on the upper surface US of the work-piece PO.

The lens effect (condensing or diffusing effect) caused by the thermal lens effect, Kerr effect or Pockels effect is adjusted by means of the following factors.

(1) The material characteristics of the NA converter 120 (in the case of a thermal lens effect: material characteristics such as absorbency, change rate of the refractive index with respect to temperature, and thermal conductivity; in the case of Kerr effect or Pockels effect: the non-linear optical constant)

(2) The pulse output of the laser light LB (3) An interaction length (a transmission distance of the laser light LB)

(4) A beam diameter of the laser light LB

In addition to these factors, the laser beam machine 100 may be appropriately designed in accordance with the work-piece PO (i.e., light intensity (pulse output), which is a threshold of abrasion, depends on a material type of the work-piece PO), a machining shape and an optical configuration of the laser beam machine 100 (e.g., a distance from the laser source 110 to the work-piece PO).

A focal distance and position of the condensing lens 160 may be set so that the focal point of the laser light LB is the closest to the upper surface US of the work-piece PO when the pulse output from the laser light LB passing through the NA converter 120 is at the lowest value in an expected variation range (expected fluctuation) whereas the focal point of the laser light LB is distanced upwards from the upper surface US of the work-piece PO as the variation range of the pulse output (the expected fluctuation) becomes larger.

As described above, the NA converter 120 is set so that the second harmonic light wave (converted light CB) becomes more diffused as the pulse output becomes larger. The NA converter 120 may be preferably set so that the focal point of the laser light LB is the closest to the upper surface US of the work-piece PO when the pulse output of the laser light LB is the lowest in the expected variation range, like the aforementioned condensing lens 160. In this case, the NA converter 120 is preferably set so that the focal point of the laser light LB moves downwards from the upper surface US of the work-piece PO as the variation range of the pulse output (expected fluctuation) increases while the pulse output of the laser light LB is the lowest in the expected variation range, unlike the aforementioned condensing lens 160. Therefore, there may be little abrasion on the upper surface US of the work-piece PO even by means of a compact and inexpensive optical configuration.

The aforementioned optical configuration suitably decreases a variance in the light intensity on the upper surface US of the work-piece PO caused by the variation in the pulse output. Therefore, abrasion is less likely to occur on the upper surface US of the work-piece PO.

A crystal which causes a thermal lens effect may be suitably used as the NA converter 120, which is incorporated into the inexpensive laser beam machine 100. This type of the NA converter 120 absorbs a part of the laser light LB generated inside the laser source 110 and causes a thermal lens effect which changes a lens power (condensing or diffusing effect) with an absorption amount of the laser light LB. By means of the thermal lens effect, the NA converter 120 may change the NA. As described above, the NA converter 120 is designed so that a beam diameter becomes larger on the upper surface US of the work-piece PO as the pulse output increases. Consequently, even if the pulse output varies, a change in the light intensity (i.e., the temperature rise amount) is less likely to occur on the upper surface US of the work-piece PO.

If the NA converter 120 which uses a thermal lens effect is incorporated, the laser source 110 is manufactured relatively inexpensively. The laser source 110 may appropriately show the aforementioned abrasion reduction effects.

If the NA converter 120 using a thermal lens effect is employed, the change rate of the refractive index of the crystal used in the NA converter 120 with respect to temperature, (dn/dT), is preferably no less than $10^{-6}$. The NA converter 120 may be designed so that the optical path of the laser light LB on the crystal is no less than 3 μm. Consequently, the NA changes with smaller absorption of the laser light LB. Therefore, heat generation inside the NA converter 120 is decreased to stabilize operation of the laser source 110.

Figure 4A:
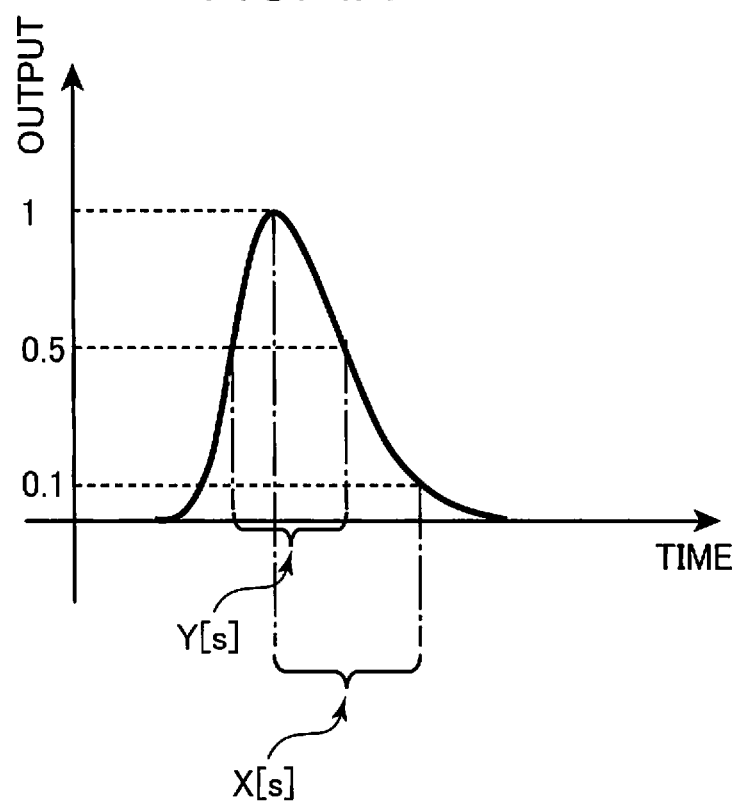
FIG. 4A is a graph schematically showing a pulse output waveform of laser light emitted from a laser source.
Figure 4B:
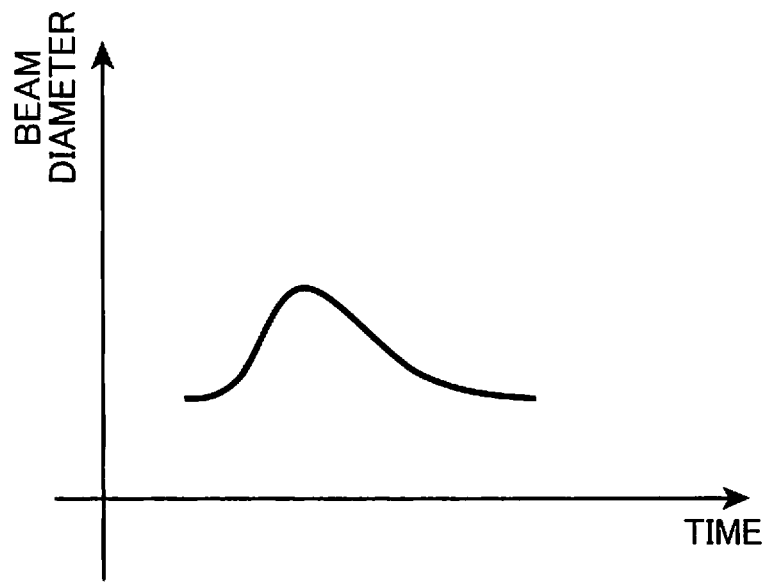
FIG. 4B is a graph schematically showing a temporal change in a beam diameter of the laser light having the pulse output waveform shown in FIG. 4A.

FIG. 4A is a graph schematically showing a pulse output waveform of the laser light LB emitted from the laser source 110. FIG. 4B is a graph schematically showing a temporal change in a beam diameter of the laser light LB having the pulse output waveform shown in FIG. 4A. The temporal change in the pulse output waveform of the laser light LB and the beam diameter of the laser light LB are described with reference to FIGS. 1, 4A and 4B.

If the laser light LB has short pulses with a pulse width of no more than 1 fs, and a low pulse frequency (e.g., approximately 1 Hz), it may be preferable that a non-linear optical crystal causing Pockels effect or Kerr effect is used as the NA converter 120. The term "pulse width" means the full width at half maximum of the laser output waveform for one pulse. In FIG. 4A, "pulse width" is expressed as Y [s]. As shown in FIG. 4B, due to the non-linear optical effects obtained from the non-linear optical crystal, the beam diameter changes over time with the pulse waveform within one pulse. Accordingly, the peak light intensity is restricted so that a change in the beam diameter required to cause little abrasion is reduced. This contributes to maintaining consistent marking shapes (i.e., equalization).

The non-linear optical crystal which causes Kerr effect is particularly suitable as the NA converter 120. If the non-linear optical crystal which causes Kerr effect is used as the NA converter 120, and even if the laser beam machine 100 has relatively small power, a required NA change for the abrasion reduction is obtained.

If a distance from the laser source 110 to the work surface (the upper surface US of the work-piece PO) is no less than 10 cm, it is preferable to use a crystal causing Pockels effect as the NA converter 120, since the crystal has characteristics to well maintain directionality of the laser light.

Figure 5:
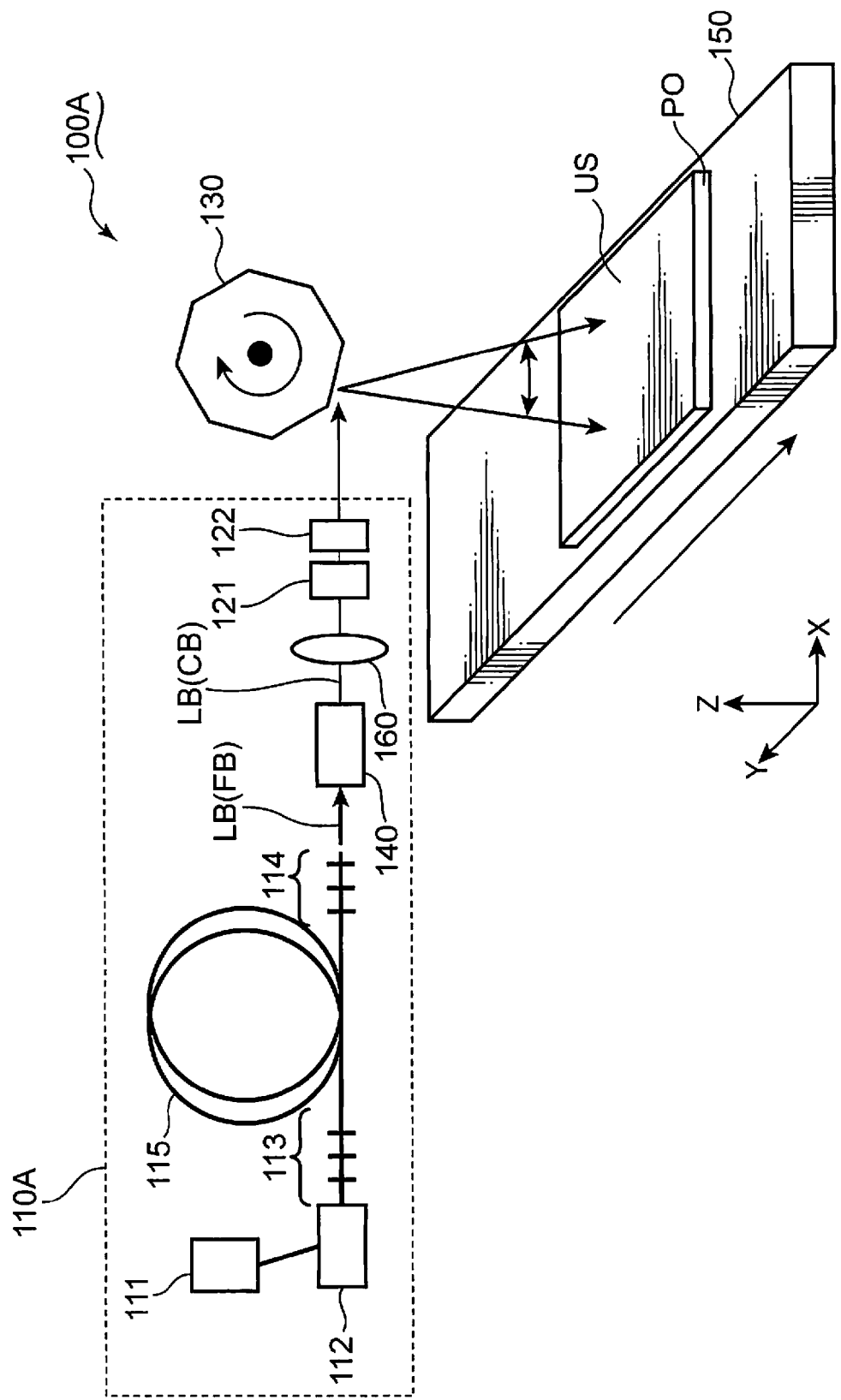
FIG. 5 is a schematic view of a laser beam machine equipped with a laser source having two NA converters as the NA converting portion.

FIG. 5 is a schematic view of a laser beam machine equipped with a laser source using two NA converters as the NA converting portion. The laser beam machine equipped with the laser source with the two NA converters is described with reference to FIGS. 1 and 5.

The laser beam machine 100A shown in FIG. 5 includes a laser source 110A, in addition to the scanning mirror 130 and the stage 150, like the laser beam machine 100 described with reference to FIG. 1. The laser source 110A includes a first NA converter 121, which causes a thermal lens effect, and a second NA converter 122, which causes Pockels or Kerr effect, in addition to the LD power source 111, pump LD 112, fiber gratings 113, 114, double-clad fiber 115, wavelength conversion module 140 and condensing lens 160, which are described with reference to FIG. 1. The first and second NA converters 121, 122 are used as the NA converting portion. For example, if a combination of the first NA converter 121 using the thermal lens effect and the second NA converter 122 using Pockels effect is employed, the second NA converter 122 using Pockels effect may be manufactured more compactly and inexpensively. In addition, an abrasion reduction effect becomes greater in comparison with an NA converter which causes a thermal lens effect only. In the laser beam machine 100A shown in FIG. 5, the first and second NA converters 121, 122 are exemplified as the adjuster.

The NA converter 120 described with reference to FIG. 1 may cause both a thermal lens effect and Pockels or Kerr effect to reduce a number of optical components used in the laser source 110. Therefore, the laser source 110 may be manufactured compactly and inexpensively.

Figure 6:
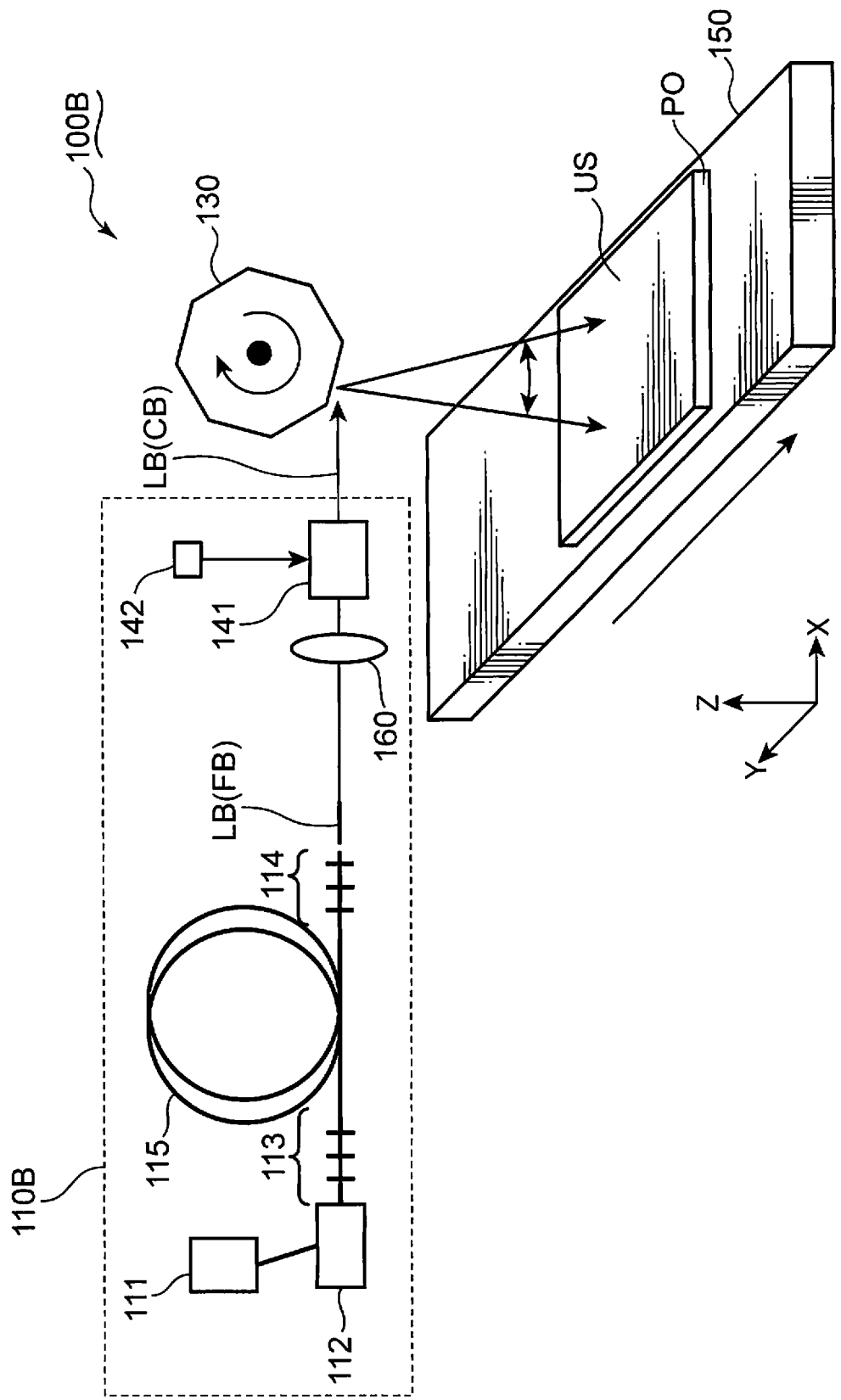
FIG. 6 is a schematic view of a laser beam machine equipped with a wavelength conversion module having an NA converting function.

FIG. 6 is a schematic view of a laser beam machine equipped with a wavelength conversion module having an NA converting function. The laser beam machine equipped with the wavelength conversion module having an NA converting function is described with reference to FIGS. 1 and 6.

The laser beam machine 100B shown in FIG. 6 includes a laser source 110B, in addition to the scanning mirror 130 and the stage 150, like the laser beam machine 100 described with reference to FIG. 1. The laser source 110B includes a wavelength conversion module 141 having an NA converting function, in addition to the LD power source 111, pump LD 112, fiber gratings 113, 114, double-clad fiber 115 and condensing lens 160, which are described with reference to FIG. 1. The condensing lens 160 condenses the fundamental light wave FB on the wavelength conversion module 141. The wavelength conversion module 141, which is used as the NA converting portion, converts the fundamental light wave FB condensed by the condensing lens 160 into the converted light CB. In this case, a material having NA converting characteristics and wavelength converting characteristics is required for the wavelength conversion module 141. This may result in decreased design freedom for optical components but a number of optical components used in the laser source 110B may be reduced. Consequently, the laser source 110B may become more compact. The wavelength conversion module 141 having an NA converting function is exemplified as the adjuster.

As shown in FIG. 6, it is preferable that the laser source 110B includes an ultraviolet light source 142 which irradiates ultraviolet light onto the wavelength conversion module 141. Consequently, the wavelength conversion module 141 having an NA converting function shows an adjustment function to the NA conversion effect (the condensing or diffusing effect: lens power). For instance, the wavelength conversion module 141 includes a wavelength conversion element made of a $LiNbO_3$ based non-linear optical crystal. The ultraviolet light generated by the ultraviolet light source 142 is irradiated onto the wavelength conversion element. Accordingly, the wavelength conversion element performs NA conversion and wavelength conversion. The $LiNbO_3$ based non-linear optical crystal used as the wavelength conversion element causes a thermal lens effect for light from an ultraviolet to infrared range. Therefore, the wavelength conversion module 141 having an NA converting function is formed inexpensively. The higher the intensity of the ultraviolet light irradiated, the stronger the thermal lens effect of the $LiNbO_3$ based non-linear optical crystal. Therefore, the NA conversion effect goes up. In other words, the NA conversion effect depends on both the pulse output of the laser light and the intensity of the ultraviolet light.

Light intensity required for machining and threshold light intensity at which abrasion occurs are dependent on a material type of the work-piece PO. The laser source 110B, which has an adjustment function (ultraviolet light source 142) to the NA conversion effect as well as the pulse output of the laser light LB, may adjust the NA effect so that an optical beam diameter on the upper surface US of the work-piece PO is set in accordance with a material type of the work-piece PO.

The present inventors discovered that a greater thermal lens effect is obtained if ultraviolet light of a wavelength, which is no more than 380 nm, is irradiated onto $LiNbO_3$. Consequently, it is preferable that the ultraviolet light irradiated from the ultraviolet light source 142 includes a light wavelength, which is no more than 380 nm. Therefore, a required NA conversion effect is obtained with ultraviolet light of lower output, which results in cost and power savings.

Figure 7:
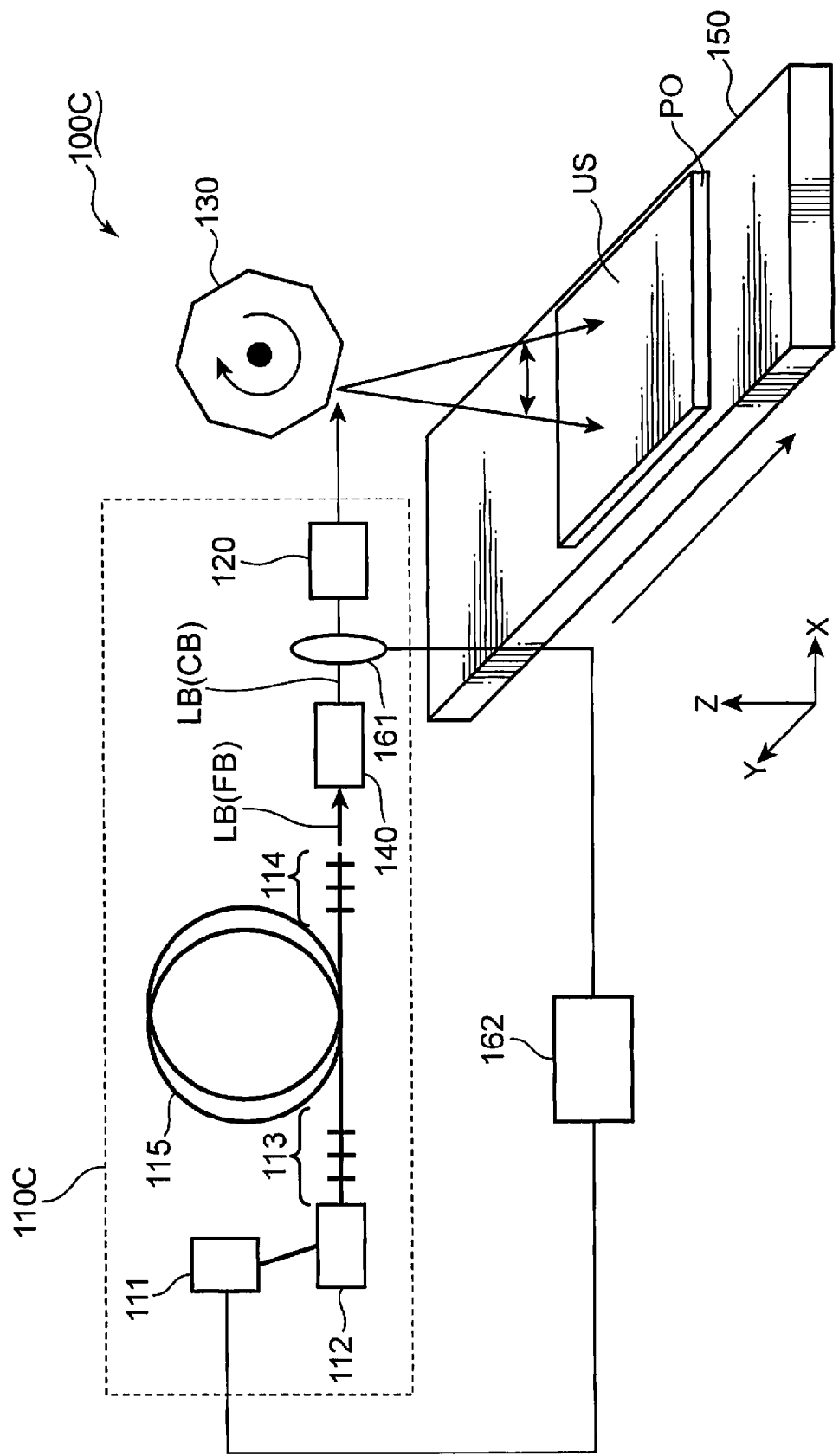
FIG. 7 is a schematic view of a laser beam machine having an adjustment function to an NA conversion effect.

FIG. 7 is a schematic view of a laser beam machine having an adjustment function to the NA conversion effect. The laser beam machine equipped with a wavelength conversion module having the adjustment function to the NA conversion effect is described with reference to FIGS. 1 and 7.

The laser beam machine 100C shown in FIG. 7 includes a laser source 110C, in addition to the scanning mirror 130 and the stage 150, like the laser beam machine 100 described with reference to FIG. 1. The laser source 110C includes an adjuster 161 configured to adjust a beam diameter of the laser light LB in the NA converter 120, in addition to the LD power source 111, pump LD 112, fiber gratings 113, 114, double-clad fiber 115, wavelength conversion module 140 and NA converter 120, which are described with reference to FIG. 1. For example, a variable focus lens may be used as the adjuster 161. In the NA converter 120 having Pockels effect, Kerr effect and/or thermal lens effect, the NA conversion effect is adjusted in response to a beam diameter of the laser light LB inside the NA converter 120.

For example, the laser beam machine 110C may include a control panel 162 which is operated by a user. The control panel 162 may store, for example, a database which associates material types of the work-piece PO with suitable NA conversion effects for the material types of the work-piece PO. If the user inputs a material type of the work-piece PO via the control panel 162, the control panel 162 controls the LD power source 111 and the adjuster 161 in response to the input material type. Accordingly, the work-piece PO is machined under suitable NA conversion conditions.

Arrangement of optical elements used in the laser source 110 is described further with reference to FIG. 1.

The laser source 110 shown in FIG. 1 includes the condensing lens 160 in front of the NA converter 120. The condensing lens 160, NA converter 120 and scanning mirror 130 are sequentially arranged along the optical path of the converted light CB which has a wavelength converted by the wavelength conversion module 140. However, the arrangement of these optical elements may be different from that shown in FIG. 1. Another condensing optical system may be used instead of the condensing lens 160.

The condensing lens 160 and the NA converter 120 shown in FIG. 1 are arranged between the scanning mirror 130 and the wavelength conversion module 140. Therefore, the condensing lens 160 and the NA converter 120 may be relatively compact. Consequently, the laser beam machine 100 may become compact.

If a condensing lens is situated between the NA converter and the work-piece, it is preferable that an optical distance between the condensing lens and the NA converter is longer than a focal distance of the condensing lens. Accordingly, a laser beam machine may have a simpler optical system.

Figure 8:
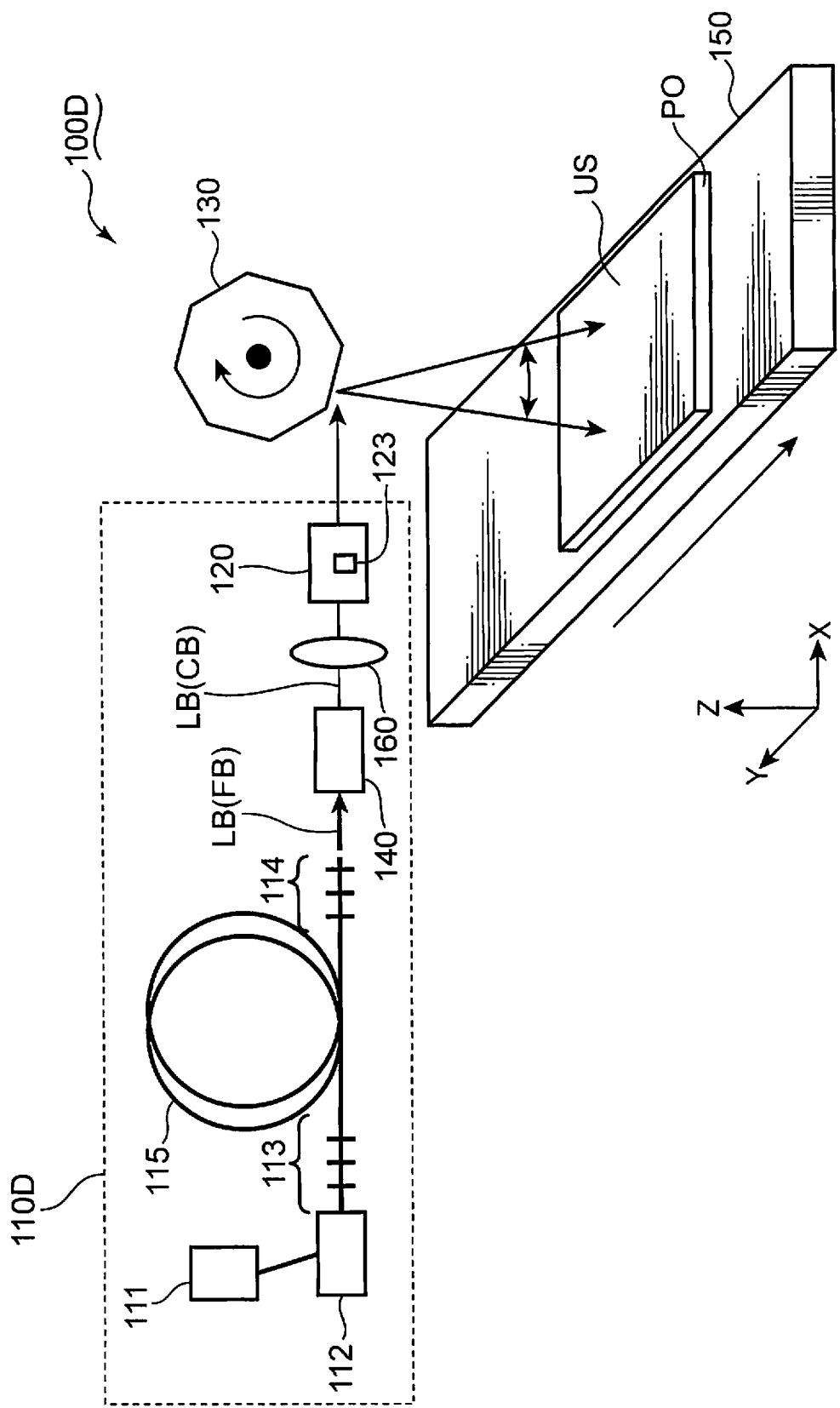
FIG. 8 is a schematic view of a laser beam machine having an adjustment function to a temperature of the NA converter.

FIG. 8 is a schematic view of a laser beam machine having an adjustment function to a temperature of the NA converter 120. The laser beam machine having the thermal adjustment function is described with reference to FIGS. 1 and 8.

The laser beam machine 100D shown in FIG. 8 includes a laser source 110D, in addition to the scanning mirror 130 and the stage 150, like the laser beam machine 100 described with reference to FIG. 1. The laser source 110D includes a thermal adjuster 123 configured to adjust a temperature of the NA converter 120, in addition to the LD power source 111, pump LD 112, fiber gratings 113, 114, double-clad fiber 115, wavelength conversion module 140, condensing lens 160 and NA converter 120 made of LiTaO$_3$ or LiNbO$_3$, which are described with reference to FIG. 1. For example, a heater or a Peltier element may be used for the thermal adjuster 123. In the present embodiment, the thermal adjuster 123 is exemplified as the second thermal adjuster.

A thermal coefficient of a refractive index of crystal (e.g., LiTaO$_3$ or LiNbO$_3$) which is used in the NA converter 120 varies with a temperature of the crystal. Therefore, the temperature change of the crystal results in a change in the NA conversion effect. If the NA converter 120 uses a thermal lens effect, it is preferable to use the thermal adjuster 123, like the laser beam machine 100D, which results in a stable NA conversion effect. Therefore, abrasion may be stably suppressed.

Second Embodiment

Figure 9:
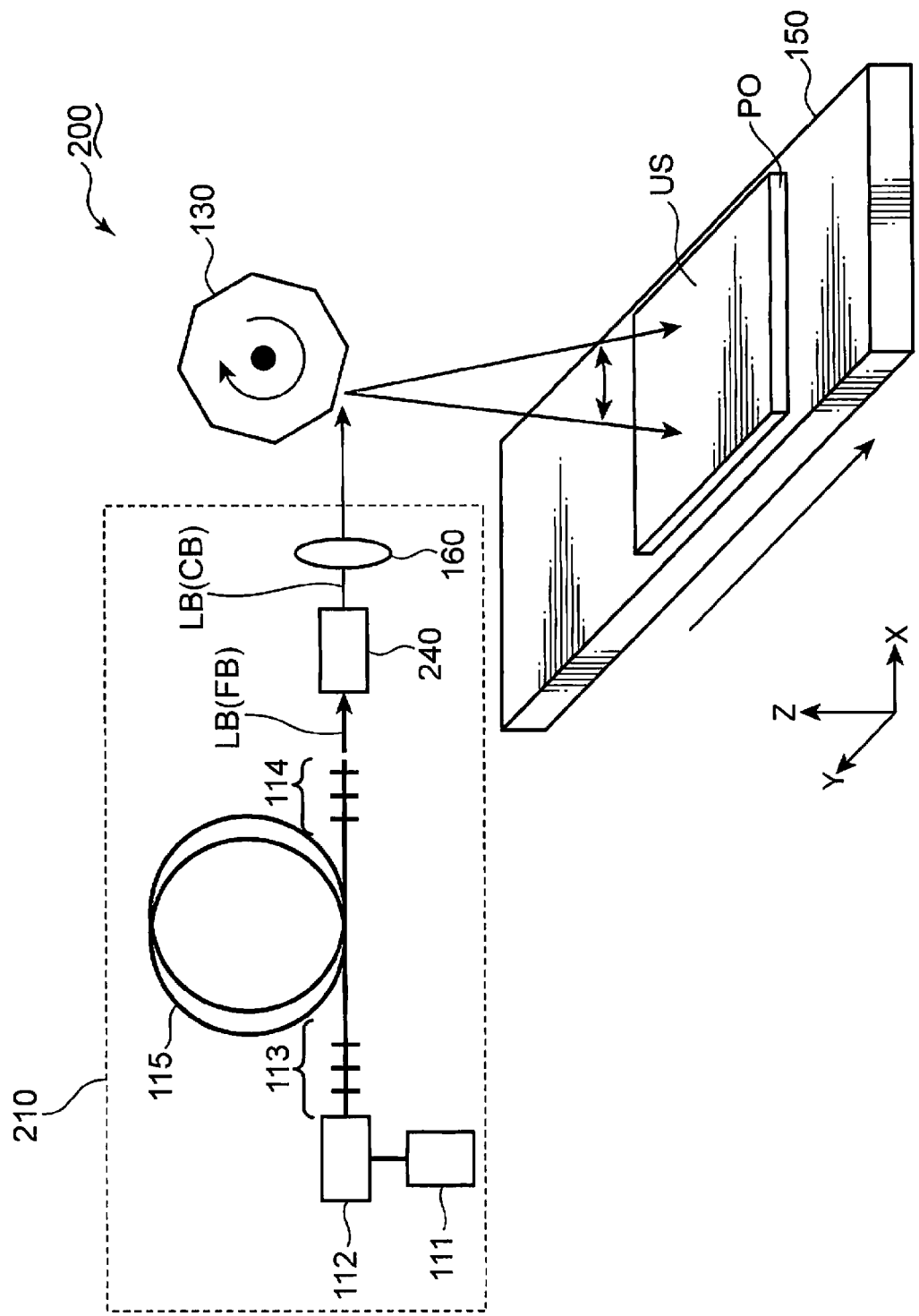
FIG. 9 is a schematic view of a laser beam machine according to the second embodiment.

FIG. 9 is a schematic view of a laser beam machine according to the second embodiment. The laser beam machine according to the second embodiment is described with reference to FIG. 9.

The laser beam machine 200 shown in FIG. 9 includes a laser source 210, in addition to the scanning mirror 130 and the stage 150, like the laser beam machine 100 described in the context of the first embodiment. The laser source 210 includes a wavelength conversion module 240, in addition to the LD power source 111, pump LD (excitation laser source) 112, fiber gratings 113, 114, double-clad fiber 115 and condensing lens 160, like the laser source 110 described in the context of the first embodiment. The wavelength conversion module 240 reduces wavelength conversion efficiency as the output of the fundamental light wave FB (central wavelength 1064 nm) emitted from the fiber grating 114 becomes greater, like the first embodiment, which results in a decreased variance in light intensity on the upper surface US of the workpiece PO. The difference from the first embodiment is the wavelength conversion module 240, which converts the fundamental light wave FB into the converted light CB as the second harmonic wave.

Figure 10A:
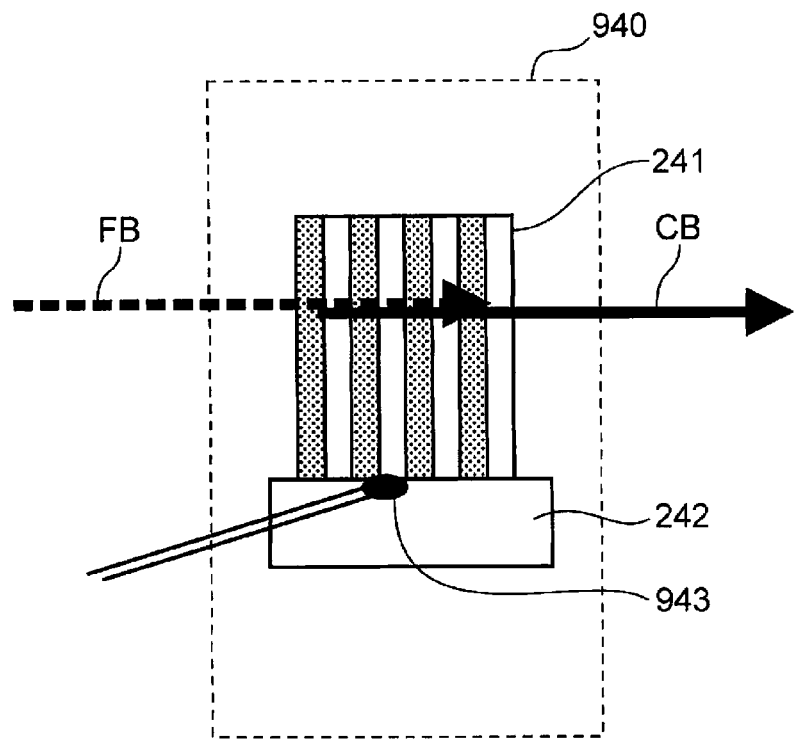
FIG. 10A is a schematic view of a conventional wavelength conversion module.
Figure 10B:
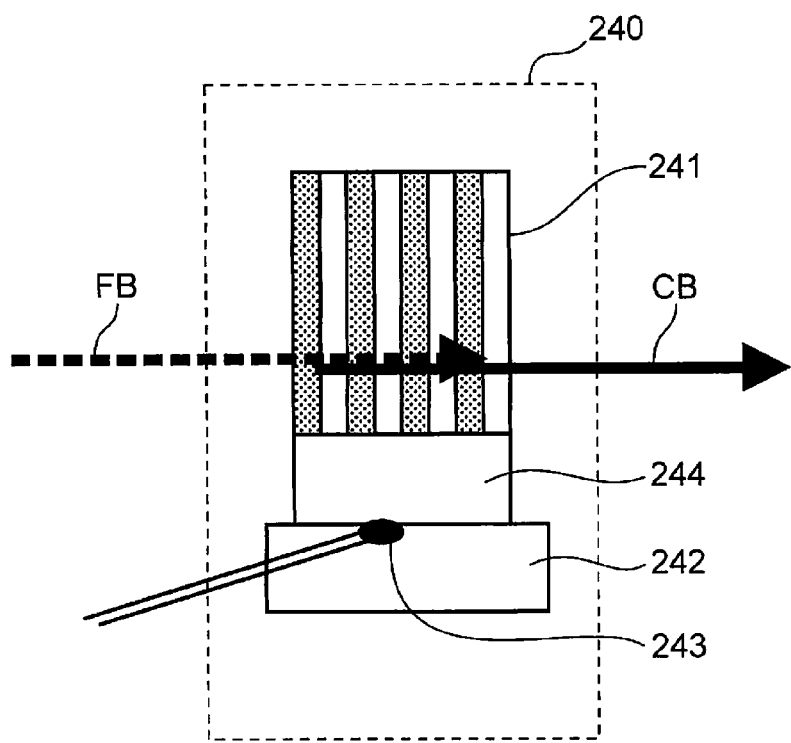
FIG. 10B is a schematic view of a wavelength conversion module which is used in a laser source of the laser beam machine shown in FIG. 9.

FIG. 10A is a schematic view of a conventional wavelength conversion module. FIG. 10B is a schematic view of the wavelength conversion module 240 used in the laser source 210 according to the present embodiment. The conventional wavelength conversion module and the wavelength conversion module 240 used in the laser source 210 of the present embodiment are compared with reference to FIGS. 9 to 10B.

The conventional wavelength conversion module 940 includes a wavelength conversion element 241 made of a non-linear optical crystal, a Peltier element 242, and a thermistor 943 which is situated between the wavelength conversion element 241 and the Peltier element 242. On the other hand, the wavelength conversion module 240 used in the laser source 210 according to the present embodiment further includes a thermal insulator 244 situated between the wavelength conversion element 241 and the Peltier element 242, in addition to the wavelength conversion element 241 and the Peltier element 242 of the conventional wavelength conversion module 940. The wavelength conversion module 240 also includes a thermistor 243 which is situated between the thermal insulator 244 and the Peltier element 242. The wavelength conversion element 241 converts the wavelength of the laser light LB (fundamental light wave FB) from the fiber grating 114. In the present embodiment, the wavelength conversion element 241 is exemplified as the wavelength convertor.

The wavelength conversion element 241 may be a quasi-phase matched wavelength conversion element made of LiNbO$_3$ which is doped with Mg, like the wavelength conversion module 140 described in the context of the first embodiment. In the wavelength conversion element 241, a periodic polarization reversed structure, in which the polarization direction is reversed by 180° at a period of approximately 7 μm, is formed. Alternatively, the wavelength conversion element 241 may be a birefringent phase matched wavelength conversion element.

If an output of the fundamental light wave FB, which is incident on the wavelength conversion element 241 of the conventional wavelength conversion module 940 shown in FIG. 10A, is increased, non-linear optical effects become more noticeable. Consequently, the wavelength conversion efficiency (which may be expressed as the output of the second harmonic light wave (converted light CB) divided by the output of the fundamental light wave FB) is also increased. If the wavelength conversion efficiency is low (about several %), the wavelength conversion efficiency becomes proportional to the output of the fundamental light wave FB. Consequently, the output of the second harmonic light wave (converted light CB) becomes proportional to a square of the output of the fundamental light wave FB.

If the conventional wavelength module 940 is incorporated into the laser source and if the output of the fundamental light wave FB varies, the output of the second harmonic light wave (converted light CB) varies to a greater extent than the fundamental light wave FB. For example, if the output of the fundamental light wave FB falls by 10%, the output of the second harmonic light wave (converted light CB) falls by 19%. If the output of the fundamental light wave FB increases by 20%, the output of the second harmonic light wave (converted light CB) increases by 44%. Consequently, a laser source incorporating a conventional wavelength conversion module 940 is likely to cause abrasion, which may result in an unstable dot shape (depth).

On the other hand, the wavelength conversion module 240 according to the present embodiment is designed so that the wavelength conversion efficiency declines as the output of the fundamental light wave FB increases.

Figure 11A:
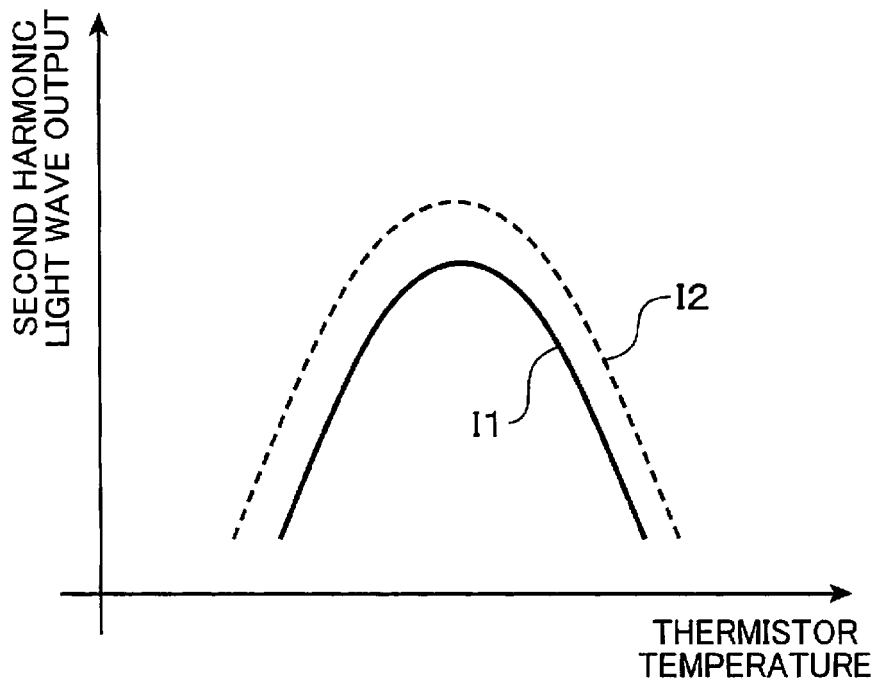
FIG. 11A is a schematic graph showing output characteristics of converted light from the wavelength conversion module shown in FIG. 10A.
Figure 11B:
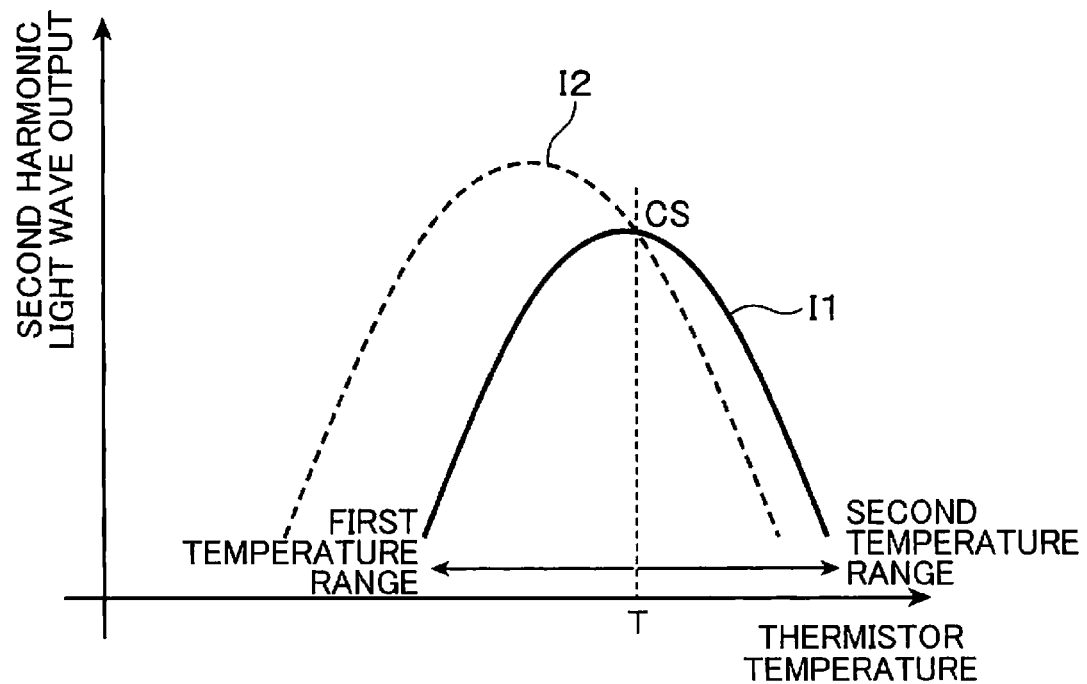
FIG. 11B is a schematic graph showing output characteristics of converted light from the wavelength conversion module shown in FIG. 10B.

FIG. 11A is a schematic graph showing output characteristics of the converted light CB from the conventional wavelength conversion module 940. FIG. 11B is a schematic graph showing output characteristics of the converted light CB in the wavelength conversion module 240 according to the present embodiment. The output characteristics of the wavelength conversion modules 940, 240 are described with reference to FIGS. 10A to 11B.

In FIGS. 11A and 11B, data indicated by the solid line show a variation in an output of the second harmonic light wave (converted light CB) when the output of the fundamental light wave FB is "I1". Data indicated by the dotted line show a variation in an output of the second harmonic light wave (converted light CB) when the output of the fundamental light wave FB is "I2" (I1>I2). Even if the output of the fundamental light wave FB is constant, the output of the second harmonic light wave (converted light CB) varies with a temperature measured by the thermistors 943, 243 (hereinafter, called "thermistor temperature") as shown in FIGS. 11A and 11B.

If the output of the fundamental light wave FB increases from "I1" to "IB", the output of the second harmonic light wave (converted light CB) from the conventional wavelength conversion module 940 increases over the entire thermistor temperatures, as shown in FIG. 11A. On the other hand, as shown in FIG. 11B, the thermal insulator 244 of the wavelength conversion module 240 according to the present embodiment creates a difference between a temperature at which the second harmonic light wave (converted light CB) reaches a peak when the output of the fundamental light wave FB is "I1", and a temperature at which the second harmonic light wave (converted light CB) reaches a peak when the output of the fundamental light wave FB is "I2". Accordingly, there is an intersection point CS defined by means of the graph which represents the output characteristics of the second harmonic light wave (converted light CB) of the wavelength conversion module 240 when the output of the fundamental light wave FB is "I1". In FIG. 11B, the temperature of the wavelength conversion element 241 at the intersection point CS is expressed as "T".

As shown in FIG. 11B, the thermal insulator 244 gives the wavelength conversion element 241 output characteristics under which the output of the second harmonic light wave (converted light CB) increases if a temperature of the wavelength conversion element 241 is in a first temperature range lower than "T" whereas the output of the second harmonic light wave (converted light CB) decreases if the temperature of the wavelength conversion element 241 is in a second temperature range above "T" as the output of the fundamental light wave FB increases. A part of the fundamental light wave FB, which is incident on the wavelength conversion element 241, and a part of the second harmonic light wave (converted light CB) are absorbed in a propagation path of the wavelength conversion element 241 along which the fundamental light wave FB and the second harmonic light wave (converted light CB) propagates. Accordingly, the wavelength conversion element 241 generates heat. The thermal insulator 244 adjusts thermal resistance between the wavelength conversion element 241 and the thermistor 243 which measures a temperature of the wavelength conversion element 241. Consequently, a thermal difference between the thermistor 243 and the propagation path is adjusted. Accordingly, a difference is created between a temperature at which the second harmonic light wave (converted light CB) reaches a peak output when the output of the fundamental light wave FB is "I1" and a temperature at which the second harmonic light wave (converted light CB) reaches a peak output when the output of the fundamental light wave FB is "I2". Therefore, in the second temperature range, the thermal insulator 244 may reduce an output of the second harmonic light wave (converted light CB) (i.e., the wavelength conversion efficiency), as the output of the fundamental light wave FB increases. In the present embodiment, the thermal insulator 244 is exemplified as the reducer. The temperature "T" at the intersection point CS is exemplified as the threshold value associated with the temperature of the wavelength convertor. The thermistor 243 is exemplified as the thermal sensing portion.

The wavelength conversion module 240, which has the output characteristics shown in FIG. 11B, may reduce a variance in the output of the second harmonic light wave (converted light CB), in comparison to a variance in the output of the fundamental light wave FB. The Peltier element 242 adjusts a temperature of the wavelength conversion element 241 in response to the temperature of the thermistor 243 so as to obtain the temperature "T" at the intersection point CS (i.e., a boundary temperature between the first temperature range, in which the output of the second harmonic light wave (converted light CB) increases as the output of the fundamental light wave FB incident on the wavelength conversion element 241 increases, and the second temperature range, in which the output from the second harmonic light wave (converted light CB) decreases as the output of the fundamental light wave FB incident on the wavelength conversion element 241 increases). In the present embodiment, the Peltier element 242 is exemplified as the first thermal adjuster.

In the present embodiment, the Peltier element 242 is controlled so that a temperature of the wavelength conversion element 241 is set between the first temperature range, in which the output of the second harmonic light wave (converted light CB) increases as the output of the fundamental light wave FB increases, and the second temperature range, in which the output of the second harmonic light wave (converted light CB) decreases as the output of the fundamental light wave FB increases. Thermal resistance of the thermal insulator 244 is designed so that the wavelength conversion efficiency falls as the output of the fundamental light wave FB increases at least at a specific thermistor temperature. Since the thermal resistance between the propagation path of the fundamental light wave FB and the thermistor 243 is set appropriately, the resultant variation in the output of the second harmonic light wave (converted light CB) from the variation in the output of the fundamental light wave FB is suppressed. Consequently, abrasion is less likely to occur.

As described above, the thermal resistance of the thermal insulator 244 is designed so that the output of the second harmonic light wave (converted light CB) declines as the output of the fundamental light wave FB increases. Since the thermal resistance between the propagation path of the fundamental light wave FB and the thermistor 243 is set appropriately, the output of the second harmonic light wave (converted light CB) is substantially consistent even if there is a variation in the output of the fundamental light wave FB. Consequently, not only the abrasion but also a fluctuation in visibility for marking dots is less likely to occur.

The laser beam machine 200 according to the present embodiment may suppress abrasion without varying a beam diameter. Consequently, the laser beam machine 200 may be superior to the first embodiment in the case of machining processes which require high accuracy in dot size. The laser beam machine according to the principles of the first embodiment may be applicable to a wide range of technologies since the wavelength conversion element is not essential.

The laser beam machine according to the principles of the second embodiment may include an NA converting portion (NA converter) provided between the work surface of the work-piece and the generator which generates the fundamental light wave. Accordingly, abrasion becomes less likely to occur due to combined effects resulting from the principles of the first and second embodiments.

The laser source 210 according to the principles of the second embodiment stabilizes an output of the second harmonic light wave (converted light CB). Therefore, the laser source 210 may be used as a light source for various apparatuses, such as a laser display or laser annealing device.

Third Embodiment

Figure 12:
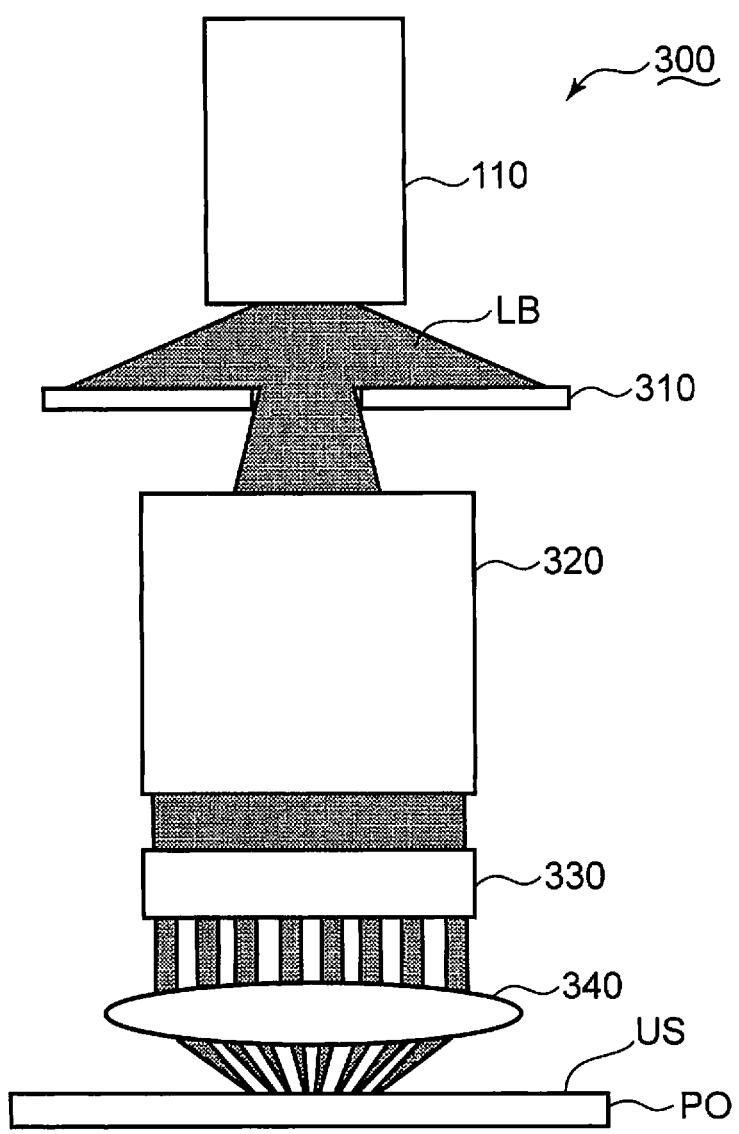
FIG. 12 is a schematic view of a laser beam machine according to the third embodiment.

FIG. 12 is a schematic view of a laser beam machine according to the third embodiment. The laser beam machine according to the third embodiment is described with reference to FIGS. 1 and 12.

The laser beam machine 300 according to the third embodiment includes a spatial modulator 330, in addition the laser source 110 described in the context of the first embodiment. The laser light LB emitted from the laser source 110 passes through the spatial modulator 330, and then is irradiated onto the upper surface US (work surface) of the work-piece PO. Consequently, laser marking is carried out at high speed on the upper surface US of the work-piece PO.

The laser beam machine 300 includes an aperture plate 310, on which an aperture is formed, and a beam homogenizer 320, which makes a smooth energy distribution of the laser light LB passing through the aperture plate 310, in addition to the laser source 110 described in the context of the first embodiment. In the present embodiment, the beam homogenizer 320 makes a light intensity distribution smooth in the perpendicular plane to the propagation direction of the laser light LB emitted from the laser source 110. Therefore, the beam homogenizer 320 is exemplified as the smoothing element. The aperture plate 310, which is situated between the laser source 110 and the beam homogenizer 320, is exemplified as the aperture element.

As described in the context of the first embodiment, the laser source 110 includes the NA converter 120. Therefore, an NA of the emitted laser light LB may be changed in response to a magnitude of the pulse output. Consequently, the pulse output increases as a beam diameter of the laser light LB becomes larger on the aperture plate 310. Accordingly, a variance in the output of the laser light LB, which is incident on the beam homogenizer 320 via the aperture plate 310, is smaller than a variance in the output of the laser light LB irradiated from the laser source 110.

The spatial modulator 330 is driven so that the spatial modulator 330 creates a pattern of transmission regions, which allows transmission of the laser light LB, and non-transmission regions, which do not allow transmission of the laser light LB, in accordance with a machining pattern. The laser light LB transmitted through the beam homogenizer 320 is incident on the spatial modulator 330. The spatial modulator 330 changes a light intensity distribution in the perpendicular plane to the propagation direction of the laser light LB in response to the formation of the transmission regions and the non-transmission regions. The spatial modulator 330 may be an optical element such as a liquid crystal mask or DMD mirror. If the machining pattern is consistent, the spatial modulator 330 may be made of metal.

The laser beam machine 300 also includes a condensing lens 340 configured to condense the laser light LB, which has a light intensity distribution changed by the spatial modulator 330, on the upper surface US of the work-piece PO (e.g., a semiconductor wafer). In the present embodiment, the condensing lens 340 is exemplified as the optical system which guides the laser light LB to the work-piece PO.

According to the principles of the present embodiment, one pulse of the laser light LB is irradiated onto several locations on the work-piece PO. Therefore, the laser beam machine 300 according to the present embodiment may carry out laser machining processes for markings at higher speed than the laser beam machine 100 described in the context of the first embodiment. The laser beam machine 100 described in the context of the first embodiment requires a smaller output from the laser source 110 than the laser beam machine 300 according to the present embodiment. Therefore, the laser source 110 which is incorporated into the laser beam machine 100 may become more compact.

According to the principles of the present embodiment, since the laser source 110 and the aperture plate 310 are incorporated into the laser beam machine 300, abrasion becomes less likely to occur.

Fourth Embodiment

Figure 13:
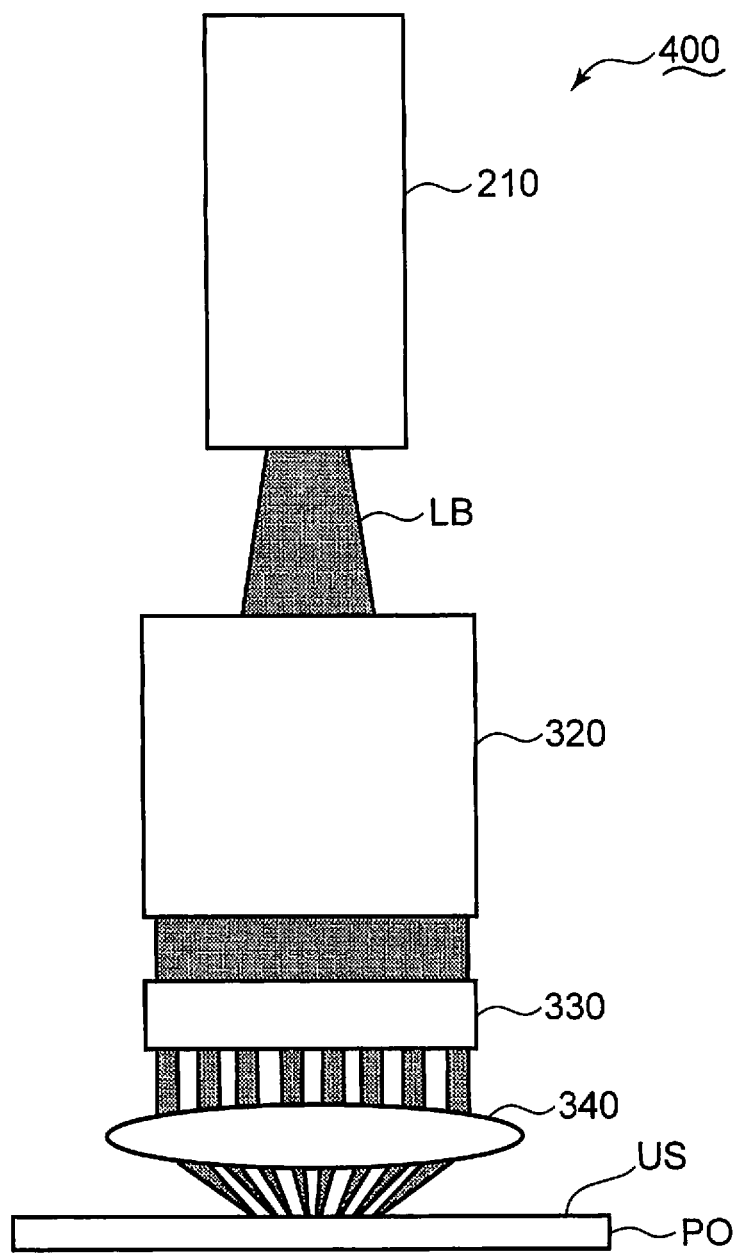
FIG. 13 is a schematic view of a laser beam machine according to the fourth embodiment.

FIG. 13 is a schematic view of a laser beam machine according to the fourth embodiment. The laser beam machine according to the fourth embodiment is described with reference to FIGS. 9 and 13.

The laser beam machine 400 according to the fourth embodiment includes a spatial modulator 330, in addition the laser source 210 described in the context of the second embodiment. The laser light LB emitted from the laser source 210 passes through the spatial modulator 330, and then is irradiated onto the upper surface US (work surface) of the work-piece PO. Consequently, laser marking is carried out at high speed on the upper surface US of the work-piece PO.

The laser beam machine 400 includes a beam homogenizer 320 which makes a smooth energy distribution of the laser light LB emitted from the laser source 210, in addition to the laser source 210 described in the context of the second embodiment. In the present embodiment, the beam homogenizer 320 makes a light intensity distribution smooth in the perpendicular plane to the propagation direction of the laser light LB emitted from the laser source 210. Therefore, the beam homogenizer 320 is exemplified as the smoothing element.

The spatial modulator 330 is driven so that the spatial modulator 330 creates a pattern of transmission regions, which allow transmission of the laser light LB, and non-transmission regions, which do not allow transmission of the laser light LB, in accordance with a machining pattern. The laser light LB transmitted through the beam homogenizer 320 is incident on the spatial modulator 330. The spatial modulator 330 changes a light intensity distribution in the perpendicular plane to the propagation direction of the laser light LB in response to the formation of the transmission regions and the non-transmission regions. The spatial modulator 330 may be an optical element such as a liquid crystal mask or DMD mirror. If the machining pattern is consistent, the spatial modulator 330 may be made of metal.

The laser beam machine 400 also includes a condensing lens 340 configured to condense the laser light LB, which has a light intensity distribution changed by the spatial modulator 330, on the upper surface US of the work-piece PO (e.g., a semiconductor wafer). In the present embodiment, the condensing lens 340 is exemplified as the optical system which guides the laser light LB to the work-piece PO.

According to the principles of the present embodiment, one pulse of laser light LB is irradiated onto several locations on the work-piece PO. Therefore, the laser beam machine 400 according to the present embodiment may carry out laser machining processes for markings at higher speed than the laser beam machine 200 described in the context of the second embodiment. The laser beam machine 200 described in the context of the second embodiment requires a smaller output from the laser source 210 than the laser beam machine 400 according to the present embodiment. Therefore, the laser source 210 which is incorporated into the laser beam machine 200 may become more compact.

According to the principles of the present embodiment, since a laser source 210, which has a stable pulse output of the irradiated laser light LB, is incorporated into the laser beam machine 400, abrasion becomes less likely to occur.

Various Modifications

The principles of the laser beam machine are described in the context of the first to fourth embodiments. The configuration of the aforementioned laser beam machines is merely exemplary. Therefore, various modifications may be adopted without deviating from the principles of a series of the aforementioned embodiments.

Modifications of a series of the aforementioned embodiments are described below in the context of the first embodiment. However, the following description is common to the aforementioned first to fourth embodiments. Consequently, the following alternative configurations and advantageous effects are also applicable to the second to fourth embodiments.

In the aforementioned first to fourth embodiments, the wavelength conversion module converts the fundamental light wave into the second harmonic light wave. Alternatively, the wavelength conversion module may convert the fundamental light wave into the third harmonic light wave. Yet alternatively, the wavelength conversion module may convert the fundamental light wave into a sum frequency light wave with other laser light. The light generated by the wavelength conversion of the wavelength conversion module (light having a different wavelength from the fundamental light wave: a second harmonic light wave or third harmonic light wave) is referred to generally as "wavelength-converted light". If laser light having a shorter wavelength (higher-order harmonic light wave) is used, the laser beam machine may carry out a finer machining process.

In the aforementioned first to fourth embodiments, the wavelength conversion module includes a wavelength conversion element made of MgLN. Alternatively, the wavelength conversion module may include a wavelength conversion element made of a non-linear optical crystal, such as MgSLT (Mg-doped lithium tantalite having a stoichiometric composition), MgSLN (Mg-doped lithium niobate having a stoichiometric composition), MgCLT (Mg-doped lithium niobate having a congruent component), or KTP or LBO. The wavelength conversion module equipped with these various types of wavelength conversion element also results in excellent advantageous effects described in the context of the first to fourth embodiments.

Figure 14:
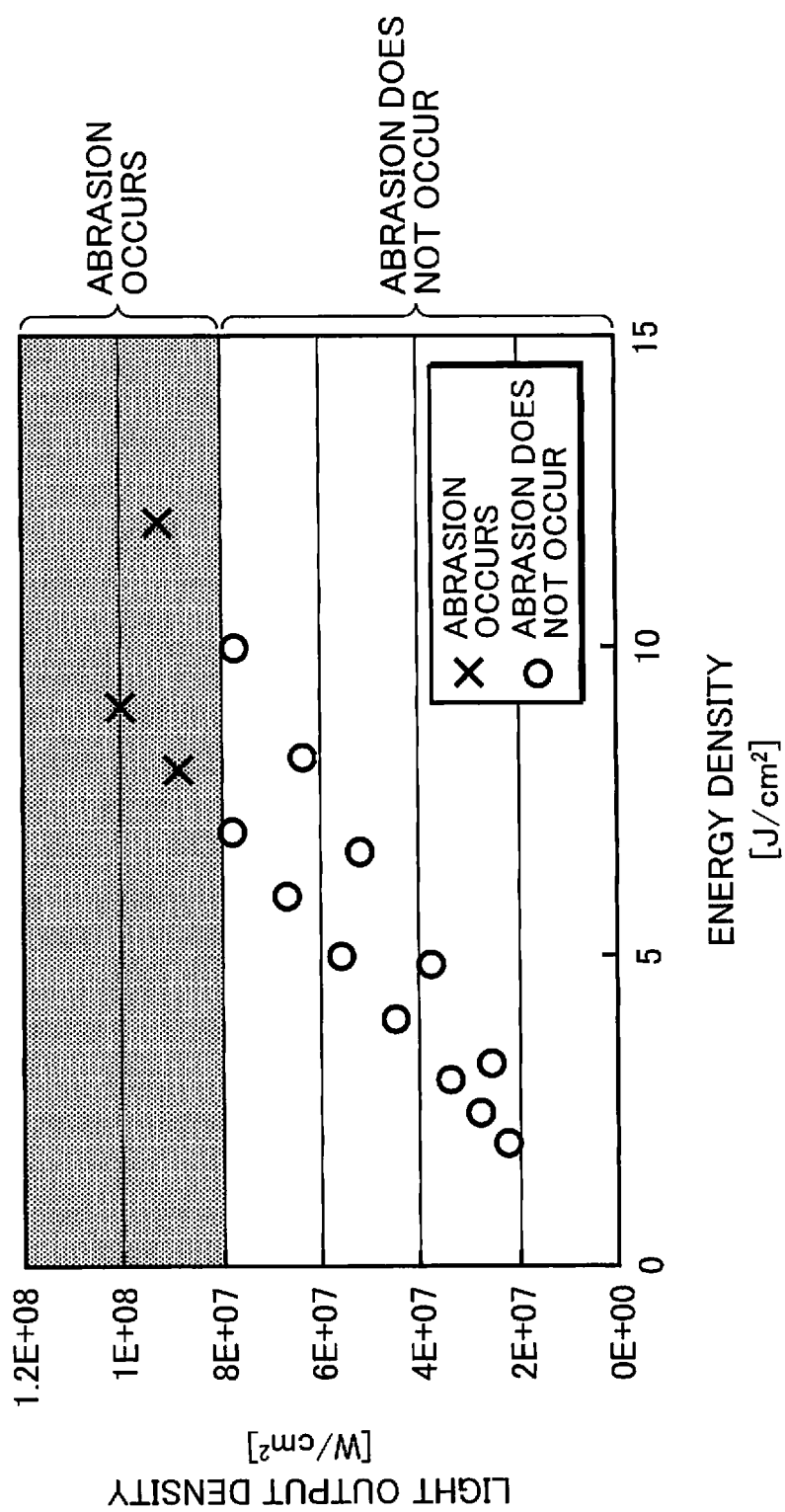
FIG. 14 is a graph showing experimental results about machining processes for a semiconductor wafer.

FIG. 14 is a graph showing experimental results about machining processes on a semiconductor wafer. The results of the machining test on the semiconductor wafer are described with reference to FIG. 14.

The present inventors carried out a machining experiment on a semiconductor wafer and discovered that abrasion occurs if the light intensity exceeds a certain threshold value, regardless of energy density per pulse of the pulsed laser light. The present inventors used a silicon wafer (c-Si) as the semiconductor wafer. The present inventors used visible light having a wavelength of no less than 520 nm and no more than 560 nm as the laser light. As described in FIG. 14, if the output density of the pulsed laser light is no more than $8.0 \times 10^7$ W/cm$^2$, little abrasion occurs. Therefore, it is figured out that a pulse width and a beam diameter on the work surface of the work-piece are set to achieve output density of $8.0 \times 10^7$ W/cm$^2$ on the work surface even at the maximum output in the range of a variation of the pulse output. Under these settings, abrasion is effectively suppressed. The output density means a value obtained by dividing an average output in a pulse width by a circular surface area inside the beam diameter ($1/e^2$). The energy density means a value obtained by dividing energy per pulse by the circular surface area inside the beam diameter ($1/e^2$).

Figure 15:
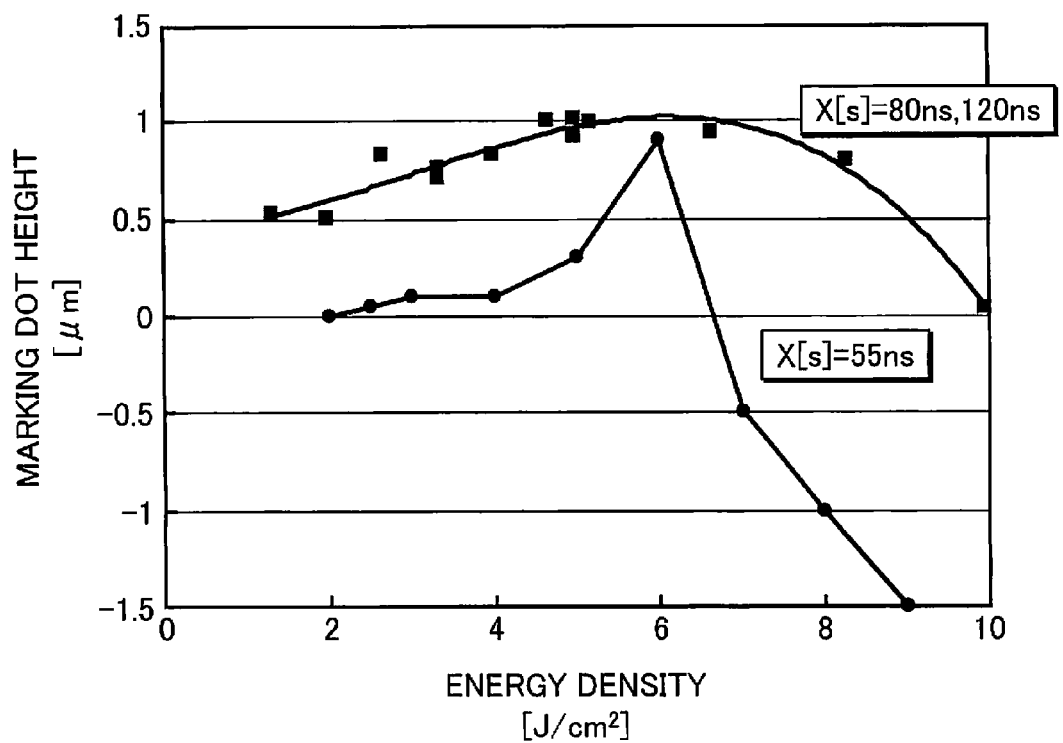
FIG. 15 is a graph showing experimental results about marking visibility.

FIG. 15 is a graph showing experimental results about marking visibility. The experiment results about the marking visibility are described with reference to FIGS. 4A and 15.

Improvement of the marking visibility is required for laser marking processes as well as abrasion prevention. In general, stabilization of the marking visibility has been considered difficult because of a resultant depth variation of marked dots from a variation in the pulse output. However, the present inventors carried out experiments about the marking visibility and verified that a height variation of marking dots is decreased by setting a fall time of the pulse waveform within a prescribed range even if there is a variation in the pulse output. In the following description, the term "fall time of the pulse waveform" means a time period from when the output becomes the maximum to when the output becomes 10% of the maximum output (the time period indicated by X [s] in FIG. 4A).

In this experiment, the present inventors set three conditions about the fall time: 55 ns, 80 ns and 120 ns. The inventors irradiated pulsed laser light (having a central wavelength of 532 nm) onto a silicon wafer under the three different conditions of the fall time, and examined a relationship between a depth of the marking dots and energy density on the work surface. Under the fall time condition of 55 ns, as shown in FIG. 15, marking dots having a depth exceeding 0.5 μm were formed only when the energy density was set to around 6 J/cm$^2$. However, under the fall time condition of 80 ns, marking dots exceeding 0.5 μm were formed in a broad energy density range from 2 J/cm$^2$ to 8 J/cm$^2$. Similar results were obtained even with the fall time condition of 120 ns.

Therefore, from a viewpoint of suppressing a fluctuation in visibility caused by the variation in the pulse output (energy density variation), it is preferable to set the fall time to no less than 80 ns. In general, it is considered that marking dots in a depth exceeding 0.5 μm achieves visibility at a detectable level. From a viewpoint of the visibility, the energy density is preferably ranged from 5 J/cm$^2$ to 7 J/cm$^2$. Accordingly, marking dots with stable visibility may be formed even under a fluctuation in energy density per pulse.

Figure 16:
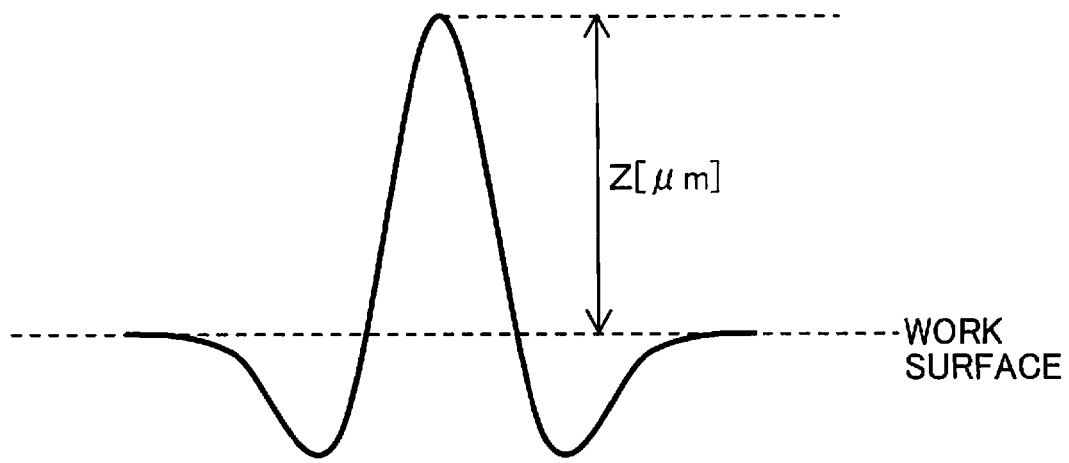
FIG. 16 is a cross-sectional view schematically showing a shape of marking dots.

FIG. 16 shows a schematic view of a marking dot shape. The marking dot shape is described with reference to FIG. 16.

The term "height of marking dots" means a distance from the central portion of a marking after irradiation of laser light (after formation of the marking dot) to the work surface before the irradiation of the laser light. FIG. 16 shows a cross-sectional shape of marking dots formed under a condition of the fall time of no less than 80 ns and energy density of no more than 10 J/cm$^2$ or a condition of the fall time of 55 ns and energy density of no less than 6 J/cm$^2$. As shown in FIG. 16, the central portion of the marking dot swells and a depression is formed around the swelled portion. In FIG. 16, the distance between the central portion (projecting portion) and the work surface is expressed as Z [μm] which is the height of the marking dot.

Figure 17:
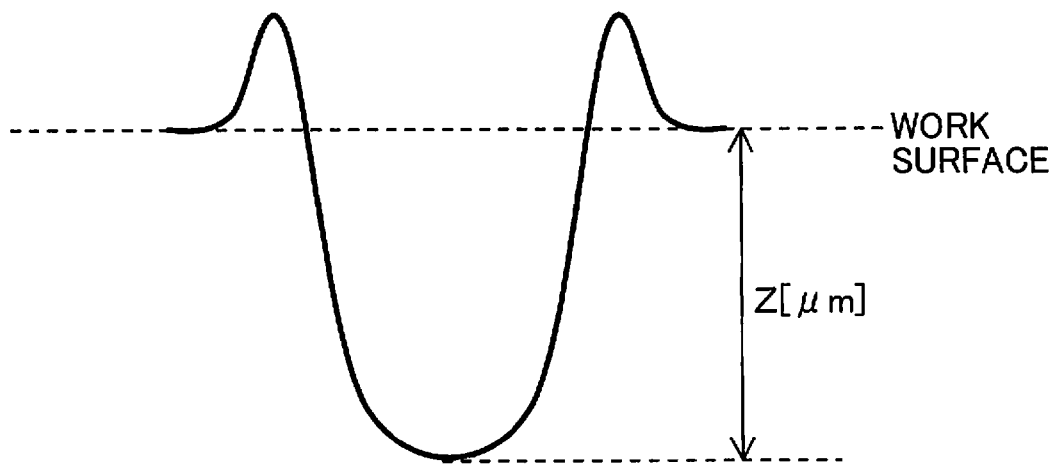
FIG. 17 is a cross-sectional view schematically showing a shape of marking dots.

FIG. 17 shows a schematic view of a marking dot shape. The marking dot shape is further described with reference to FIG. 17.

The cross-sectional shape of the marking dot shown in FIG. 17 is obtained when the pulsed laser light is irradiated under a condition of the fall time of 55 ns and energy density exceeding 6 J/cm$^2$. The cross-sectional shape of the marking dots obtained under such a condition has a depressed central portion as shown in FIG. 17. In FIG. 17, a distance between the central portion (depressed portion) and the work surface is expressed as Z [μm], which is the height of the marking dot. The height of the marking dot shown in FIG. 17 is "negative". If marking dots having a depressed central portion are formed, abrasion occurs. Accordingly, dust is scattered around the marking dot.

As described above, if a silicon wafer is machined by means of laser light having a wavelength of 532 nm, it is preferable to set a fall time of no less than 80 ns. Accordingly, a resultant fluctuation in marking visibility from a variation in the pulse output is appropriately decreased.

If the fall time is set to no less than 500 ns, the energy density becomes excessively large so that dust is scattered around the dot marks. Therefore, it is desirable to set the fall time to no less than 80 ns and no more than 500 ns.

In order to achieve the aforementioned pulse fall time, it may be preferable that the laser source according to the principles of the first to fourth embodiments is equipped with a resonator having a low Q value. The resonator has a resonator length of no less than several meters. It may also be preferable that reflectivity at reflecting section provided on a side from which the laser light is emitted is set to be no more than approximately 50%. It may be preferable that an optical system of the laser source according to the principles of the first to fourth embodiments is compact. In particular, it may be preferable that the laser source according to the principles of the first to fourth embodiments includes a fiber laser apparatus capable of very efficient laser transmission even at a low Q value. Alternatively, the laser source according to the principles of the first to fourth embodiments may preferably use laser light generated from a resonator as a fundamental light wave, and includes a wavelength conversion module which converts a wavelength of this fundamental light wave.

The knowledge on the basis of the experiments carried out on the aforementioned silicon wafer may be applicable to other materials. Consequently, advantageous effects such as little abrasion and improved marking visibility in machining processes for markings on the other materials may be obtained as a result of adjusting the fall time (cooling speed). However, since the optimal value of the fall time depends on a type of material, it is preferable for the laser beam machine to be designed so that the fall time of the pulse-oscillation is freely adjusted.

Each of the laser sources 110, 210 described in the context of the aforementioned first to fourth embodiments is a fiber laser apparatus which includes the two fiber gratings 113, 114, double-clad fiber 115 doped with laser active materials, and a laser diode (pump LD 112) for excitation. However, the principles described in the context of the first to fourth embodiments may be achieved in a solid laser apparatus (Nd:YAG, Nd:YVO$_4$) equipped with a Q switch or a fiber laser apparatus equipped with a Q switch, which has been conventionally and widely used for laser machining (laser marking). In the case of these laser sources which oscillate pulses by means of a Q switch, a pulse-oscillation frequency (pulse-oscillation interval) and a peak output simultaneously vary with a change in the fall time. Accordingly, the variation in the fall time may result in slow machining speed, increased fluctuation in marking visibility, and dust generation. On the other hand, the laser sources 110, 210 described in the context of a series of the aforementioned embodiments are so-called laser oscillators of a gain switching type. Therefore, the fall time is adjusted independently of the pulse-oscillation frequency and the peak output. Consequently, the laser sources 110, 210 may appropriately contribute to achieving the principles of the first to fourth embodiments.

Figure 18:
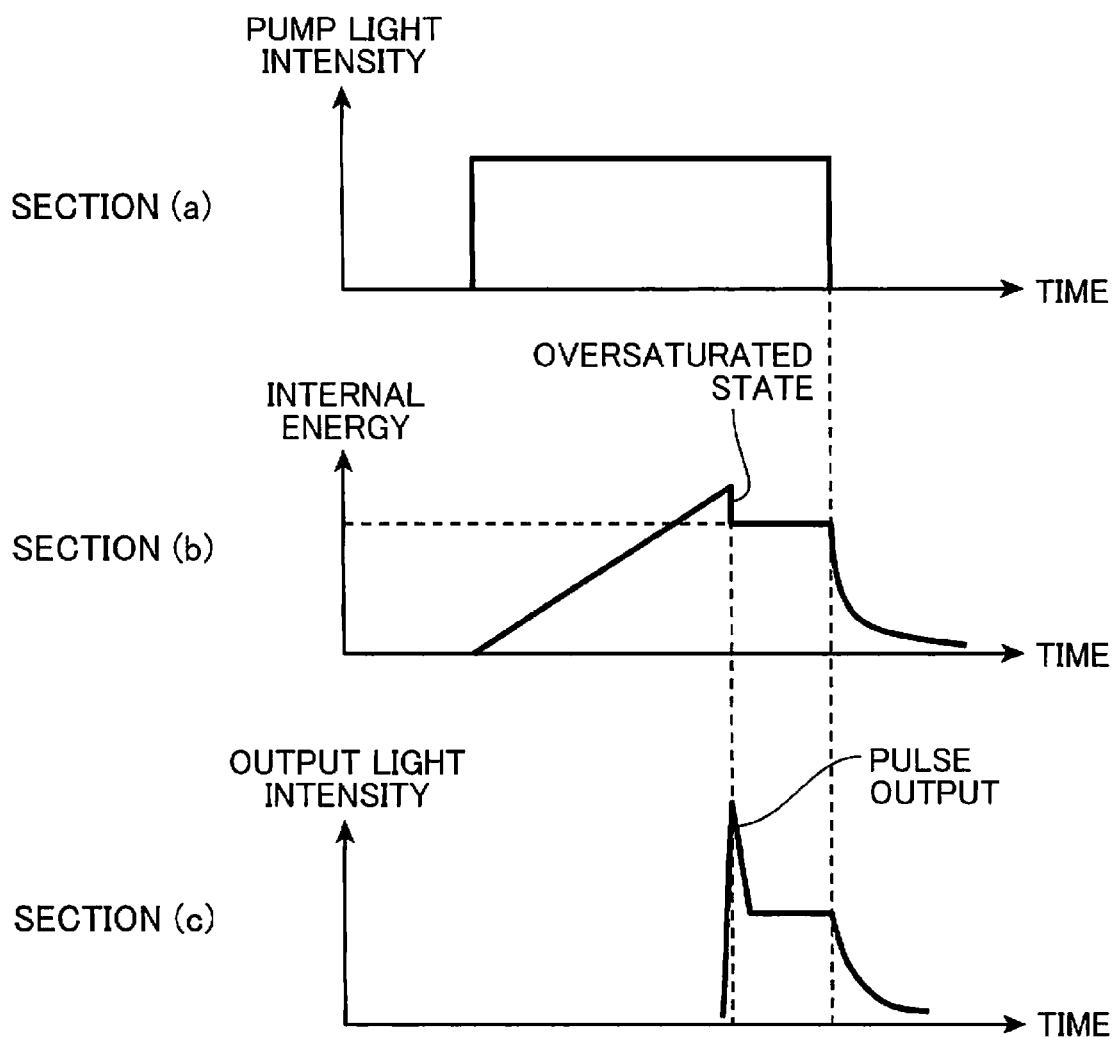
FIG. 18 is a graph schematically showing a relationship among intensity of pump light, internal energy of a double-clad fiber and intensity of a fundamental light wave.

FIG. 18 is a graph showing a relationship among intensity of the pump light, internal energy of the double-clad fiber 115 and intensity of the fundamental light wave FB. A method for adjusting the fall time by means of the laser sources 110, 210 which utilize gain switching is described with reference to FIGS. 2 and 18.

Section (a) in FIG. 18 is a schematic graph showing a temporal variation in intensity of the pump light emitted from the pump LD 112. In the present embodiment, the pump LD 112 emits the pump light which is intensity-modulated in a step shape. The pump light shown in section (a) in FIG. 2 is continuously output from the pump LD 112 even after pulse oscillation. Accordingly, CW oscillation continues after the pulse oscillation. On the other hand, the pump light shown in section (a) in FIG. 18 is halted after the pulse oscillation. As shown in section (c) in FIG. 18, the intensity of the output light (second harmonic light wave) declines after the output stoppage of the pump light. As shown in FIGS. 2 and 18, a period from the pulse oscillation to the output halt is freely adjusted by changing a drive time of the pump LD 112.

It may be figured out from the aforementioned description that the laser source 110 which utilizes the gain switching is preferable for achieving the principles of the first to fourth embodiments. It may be also figured out that the laser source 210 is preferable for achieving the principles of the first to fourth embodiments because of utilization of the gain switching.

The laser light emitted from the laser source 110 described in the context of the first to fourth embodiments is single-mode laser light (a Gaussian beam). If the emitted laser light is a Gaussian beam, and even if the condensing position departs from the work surface, a light intensity distribution, which is substantially similar to a light intensity distribution achieved under a condition of the condensing position located on the work surface, is obtained, which results in a similar machining shape to that obtained under the condition. However, the principles of the first to fourth embodiments are not limited to a single-mode laser.

Laser light in a flat-top beam state having uniform light intensity in the perpendicular plane to the propagation direction of the laser light may be used in the first to fourth embodiments. For example, the laser light in the flat-top beam state may be incident on the condensing lens 160 shown in FIG. 1, and then condensed nearby the work surface. The closer the condensed laser light to a flat-top beam, the smaller the beam diameter on the work surface, in comparison to laser light in a Gaussian beam. Consequently, finer marking dots are engraved. Alternatively, laser light in a donut beam state where light intensity at the center is lower than peripheral light intensity may be incident on the condensing lens 160, and then condensed nearby the work surface. If the laser light in the donut beam state is condensed nearby the work surface, a beam diameter on the work surface is smaller than a Gaussian beam. Consequently, markings may be made by means of multi-photon absorption characteristics of the work-piece. Therefore, finer marking dots may be engraved.

In the first to fourth embodiments, a semiconductor wafer, (in particular, a silicon wafer) is exemplified as the work-piece PO. The advantageous effects of the first to fourth embodiments are described in the context of the semiconductor wafer (in particular, a silicon wafer). In many cases of machining processes carried out on semiconductor wafers, the silicon wafer itself becomes the work-piece. However, an oxide film (SiO$_2$) or nitride film (SiN) may be formed on a surface of the wafer. Alternatively, the work-piece may be an epitaxially grown wafer or a wafer having a gallium arsenide or indium compound formed on its surface. The principles described in the context of the first to fourth embodiments are also applicable to the machining processes on these various types of wafers to obtain similar excellent results. The principles described in the context of the first to fourth embodiments are also applicable to various work-pieces such as electrodes (pads) on a bare chip, an IC surface, various ceramic products, IC lead sections and alike.

Quartz, KTaO$_3$ crystal, or an episulfide resin or urethane resin, which is utilized as a material for plastic lenses, may be used as a work-piece. For example, if the machining principles described in the context of a series of the aforementioned embodiments are used for these work-pieces, an optical element formed with a moth-eye structure (anti-reflective structure) may be manufactured.

For instance, if a moth-eye structure for visible light is formed, it is preferable to form the swelled structure represented by the cross-sectional view in FIG. 16 at narrow intervals of no more than approximately 300 nm. It is preferable that a height of the marking dots exceeds several hundred nm for the moth-eye structure for visible light.

The height of the marking dots depends on a target light wavelength of the moth-eye structure. Therefore, the height dimension of the marking dots has to be stable. With a conventional laser beam machine, the height of the marking dots is unstable while abrasion occurs occasionally, which results in difficulty in formation of the moth-eye structure.

As described above, the laser beam machine according to the first to fourth embodiments appropriately suppresses the abrasion. Since the fall time of the pulse waveform may be adjusted as described above, a stable height of the marking dots is obtained. Consequently, the laser beam machine according to the first to fourth embodiments is suitable for use in applications for forming a moth-eye structure.

The laser beam machine according to the first to fourth embodiments may change a pulse output in response to machining positions to form a moth-eye structure. Consequently, the moth-eye structure may be formed so that the moth-eye structure has various types of reflectivity and reflected wavelengths, depending on positions. Therefore, the laser beam machine according to the first to fourth embodiments is also suitable for use in shaping laser light beam profile or manufacturing optical components for eliminating color spots of illuminators such as LED illuminator.

The laser sources 110, 210 described in the context of the first to fourth embodiments may generate a second harmonic light wave around the wavelength 532 nm. Consequently, the laser sources 110, 210 described in the context of the first to fourth embodiments may be used for crystallization (laser annealing) of non-crystalline silicon (amorphous silicon) (e.g., Patent Document 1). The light intensity of the second harmonic light wave emitted from the laser sources 110, 210 is stable. Therefore, the light intensity of the second harmonic light is suitable for the crystallization of non-crystalline silicon. As a result of the stable light intensity, the crystallization of silicon having a stable and uniform grain size is achieved. Therefore, the laser sources 110, 210 described in the context of the first to fourth embodiments may be appropriately used to manufacture crystalline silicon or micro-crystalline silicon. Very efficient solar batteries may be manufactured by means of such crystalline silicon or micro-crystalline silicon.

If non-crystalline silicon, crystalline silicon and/or micro-crystalline silicon are used in a solar battery, light of various wavelengths may be absorbed and converted into electrical energy. Non-crystalline silicon absorbs light in a range of 400 nm to 700 nm, and then converts the light to electrical energy. Micro-crystalline silicon absorbs light in a range of 600 nm to 900 nm, and then converts the light to electrical energy. Crystalline silicon absorbs light in a range of 700 nm and above, and then converts the light to electrical energy.

For example, if a solar battery panel, which includes a first region containing non-crystalline silicon and a second region containing crystalline silicon, is formed so that light wavelengths of 700 nm or below are guided to the first region whereas light wavelengths longer than 700 nm are guided to the second region, the solar battery panel may very efficiently generate solar power.

Figure 19:
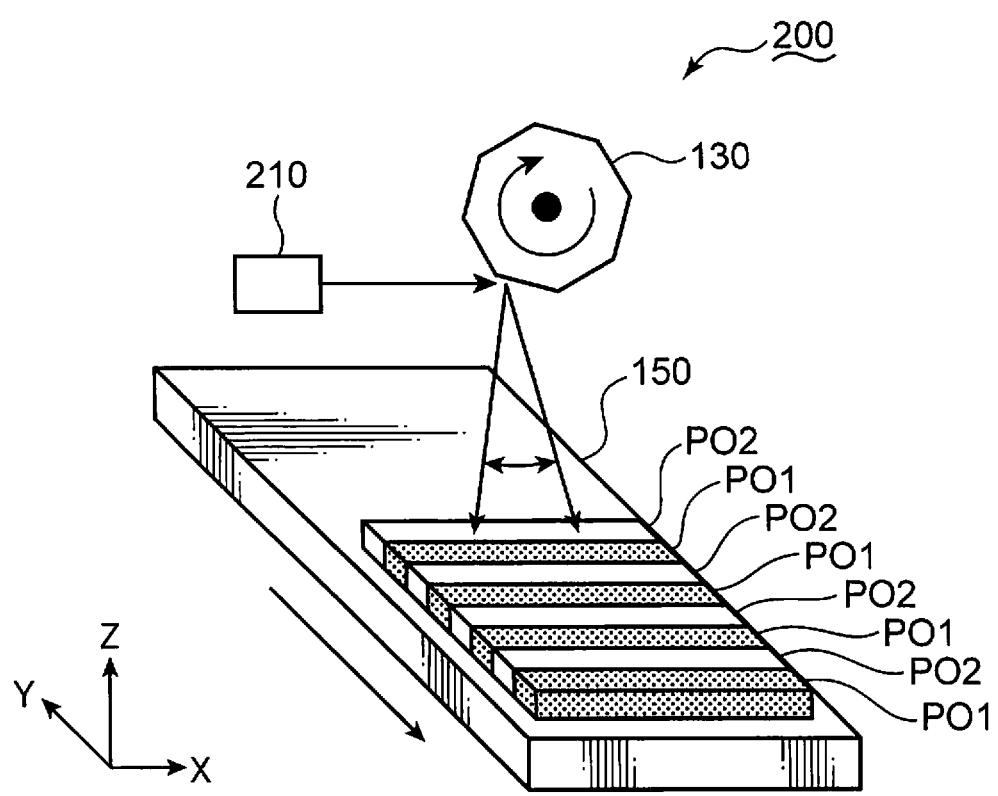
FIG. 19 is a schematic view showing a method for manufacturing a solar battery panel by means of the laser beam machine shown in FIG. 9.

FIG. 19 shows a schematic view of a method for manufacturing solar battery panels by means of the laser beam machine 200 described in the context of the second embodiment. The method for manufacturing the solar battery panels is described with reference to FIGS. 9 and 19.

Non-crystalline silicon is placed as a work-piece onto the stage 150 of the laser beam machine 200 shown in FIG. 19, instead of the semiconductor wafer described with reference to FIG. 9. As described in the context of the second embodiment, the stage 150 moves the non-crystalline silicon along the Y axis. The scanning mirror 130 performs a scanning action of the optical path of the laser light along the X axis. The laser source 210 repeatedly switches laser light oscillation on and off.

The laser oscillation from the laser source 210 is switched on to irradiate laser light on non-crystalline silicon regions, which is then laser-annealed to be crystalline silicon regions PO1. When the laser oscillation from the laser source 210 is switched off, regions on which are not subjected to the laser annealing become non-crystalline silicon regions PO2. Accordingly, a solar battery panel having the crystalline silicon regions PO1 and the non-crystalline silicon region PO2 is manufactured.

Figure 20:
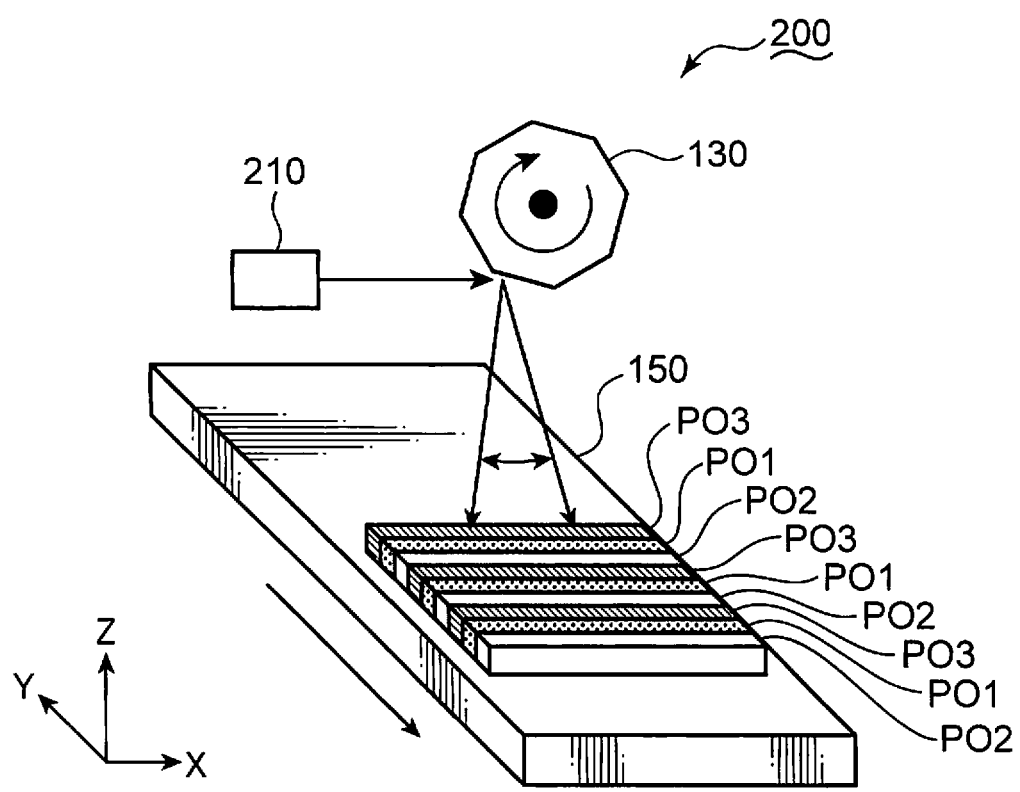
FIG. 20 is a schematic view showing another method for manufacturing a solar battery panel by means of the laser beam machine shown in FIG. 9.

FIG. 20 shows a schematic view of another method for manufacturing solar battery panels by means of the laser beam machine 200 described in the context of the second embodiment. The method for manufacturing solar battery panels is described with reference to FIGS. 19 and 20.

Non-crystalline silicon is placed as a work-piece onto the stage 150 of the laser beam machine 200 shown in FIG. 20. As described in the context of the second embodiment, the stage 150 moves the non-crystalline silicon along the Y axis. The scanning mirror 130 performs a scanning action of the optical path of the laser light along the X axis. The laser source 210 repeatedly switches laser light oscillation on and off.

The laser oscillation from the laser source 210 is switched on to irradiate laser light on non-crystalline silicon regions, which are then subjected to laser-annealing and become crystalline silicon regions PO1 or micro-crystalline silicon regions PO3. When the laser oscillation from the laser source 210 is switched off, regions on which are not subjected to the laser annealing become non-crystalline silicon regions PO2. Accordingly, a more efficient solar battery panel which includes the crystalline silicon region PO1, the micro-crystalline silicon region PO3 and the non-crystalline silicon region PO2 is manufactured.

It is preferable that the grain size in the micro-crystalline silicon region PO3 is adjusted so as to become larger towards the non-crystalline silicon region PO2 (i.e., the grain size on the micro-crystalline silicon region PO3 becomes smaller towards the crystalline silicon region PO1). Since a wavelength range of absorbed light gradually becomes longer from the non-crystalline silicon region PO2 towards the crystalline silicon region PO1, power generation of the solar battery panel becomes more efficient.

Figure 21:
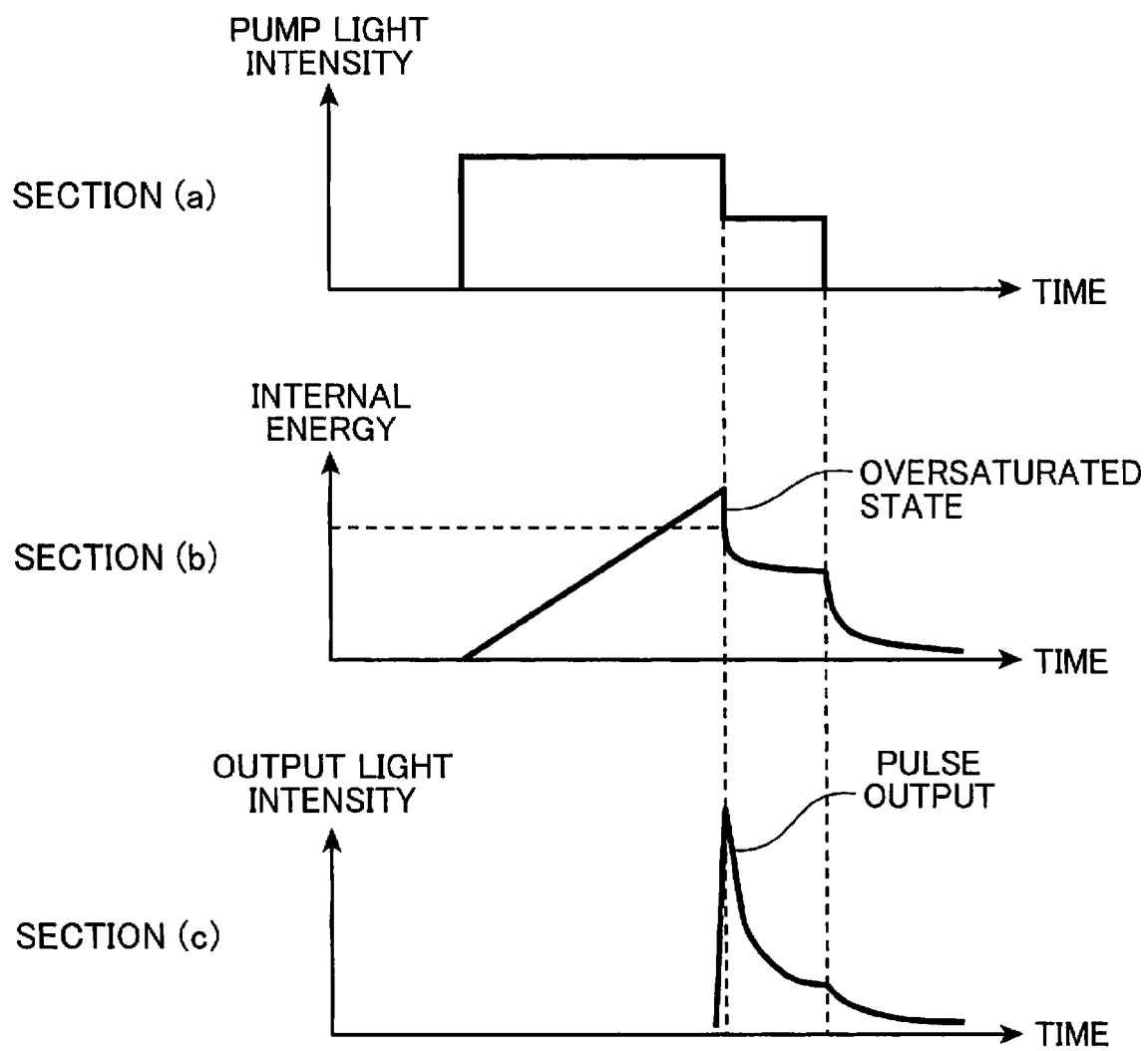
FIG. 21 is a graph schematically showing a method of pulse-oscillation for manufacturing a micro-crystalline silicon region and a crystalline silicon region which are different in grain size.

FIG. 21 is a graph schematically showing a pulse-oscillation method for manufacturing the micro-crystalline silicon region PO3 and the crystalline silicon region PO1 which are different in grain size. The method for manufacturing crystals having different grain sizes by laser annealing is described with reference to FIGS. 20 and 21.

For example, the pulsed laser light having a wavelength of 532 nm is irradiated onto non-crystalline silicon to carry out laser annealing on the silicon and starts crystallizing the silicon. The grain size varies with a temperature at the time of the silicon crystallization. Therefore, if the pulsed laser light having different fall speeds is oscillated, crystals may be produced to have different grain sizes.

As described in the context of the first to fourth embodiments, the pulse laser source utilizing gain switching is used in the laser beam machine. As described above, the pulse laser source using gain switching may freely oscillate the pulsed laser light having different rise speeds.

Section (a) in FIG. 21 shows intensity of the pump light. Section (b) in FIG. 21 shows a resultant variation in internal energy from emission of the pump light. Section (c) in FIG. 21 shows a variation in intensity of the laser light emitted from the laser source. As shown in section (a) in FIG. 21, if the intensity of the pump light declines after pulse oscillation, the fall speed of the emitted laser light increases (c.f., section (c) in FIG. 21). Accordingly, the temperature at the crystallization time is reduced. Conversely, if the intensity of the pump light after the pulse-oscillation is increased (not shown), the intensity of the oscillated laser light after the pulse-oscillation is increased. Therefore, the temperature at the crystallization time is less likely to drop.

The aforementioned thermal adjustment is achieved, independently of the pulse peak output and the pulse-oscillation frequency. Such advantageous effects are unique to a pulse laser source which uses gain switching. Consequently, a pulse laser source using gain switching is suitable for creating regions having different crystallization states described with reference to FIG. 20 (the non-crystalline silicon region PO2, the micro-crystalline silicon region PO3, and the crystalline silicon region PO1). In particular, the pulse laser source using gain switching may change a laser light output after pulse-oscillation to perform the laser annealing on the same non-crystalline silicon substrate. Therefore, the pulse laser source using gain switching is advantageous for manufacturing very efficient solar battery panels.

The laser beam machine 200 and the laser source 210, which are described in the context of the second embodiment, are used in the aforementioned method for manufacturing solar battery panels. Alternatively, a combination of the laser source 110 described in the context of the first embodiment or the laser source 110 described in the context of the third embodiment, and an aperture plate 310 may be used to manufacture solar battery panels. If these are similarly used, solar battery panels may be appropriately manufactured.

Figure 22:
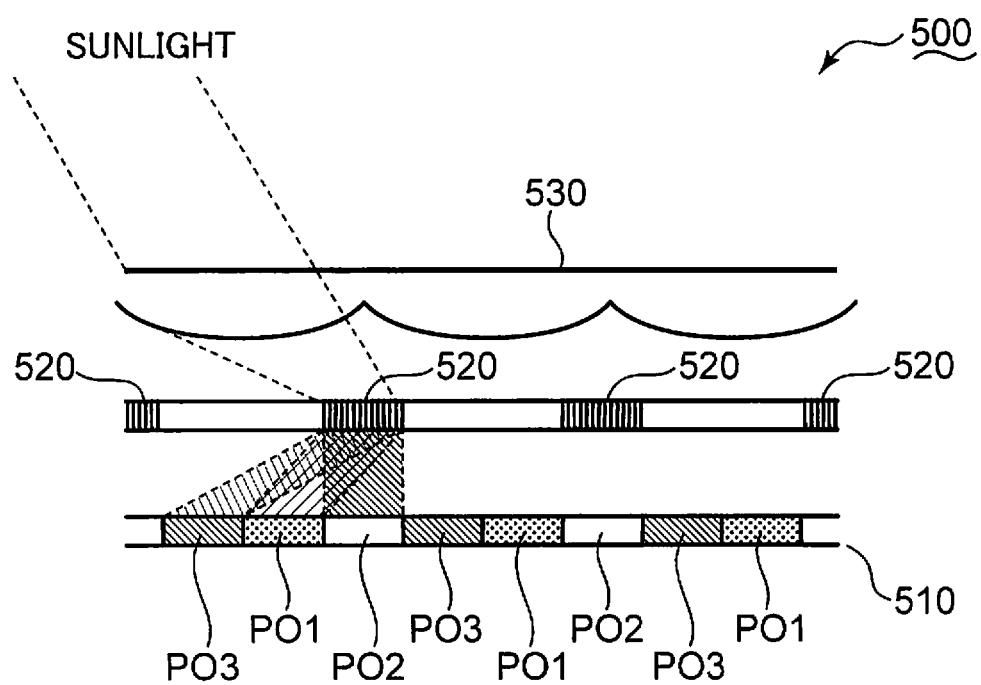
FIG. 22 is a schematic cross-sectional view of a solar battery panel.

FIG. 22 is a schematic view of a solar battery panel. An optical configuration which guides sunlight to several regions having different crystalline states is described with reference to FIG. 22.

The solar battery panel 500 includes a silicon substrate 510 having a non-crystalline silicon region PO2, a crystalline silicon region PO1 and a micro-crystalline silicon region PO3. The solar battery panel 500 also includes a wavelength separator 520 which is situated on the silicon substrate 510. The wavelength separator 520 separates the sunlight and makes light wavelengths incident on the non-crystalline silicon region PO2, the micro-crystalline silicon region PO3 and the crystalline silicon region PO1, respectively so that each region achieves the highest absorbent rate. A prism and a diffracting optical element may be exemplified as the wavelength separator 520. If a diffracting optical element is used as the wavelength separator 520, it is preferable that the diffracting optical element is designed so as not to generate zero-order diffraction light. Consequently, the solar battery panel 500 may very efficiently generate electricity. Alternatively, a mirror provided with a multi-layer film coating for wavelength separation such as a harmonic separator may be used as the wavelength separator 520.

The solar battery panel 500 may include a condensing optical element 530 which receives the sunlight before the wavelength separator 520. The condensing optical element 530 may be designed so as to condense the sunlight onto the wavelength separator 520. Consequently, the solar battery panel 500 may very efficiently generate electricity.

It may be preferable that the solar battery panel 500 includes an adjustment mechanism to an angle of the solar battery panel 500 so that an incident angle of the sunlight on the wavelength separator 520 becomes consistent. Consequently, the solar battery panel 500 may very efficiently generate electricity.

A micro lens array may be exemplified as the condensing optical element 530. In particular, it may be preferable that if a position and angle at which the sunlight is incident on the wavelength separator 520 is adjusted as a result of adjusting a relative position between a micro lens and the wavelength separator 520. Accordingly, even if the angle of the solar battery panel 500 by itself is not adjusted, the solar battery panel 500 may very efficiently generate electricity.

Fifth Embodiment

Figure 23:
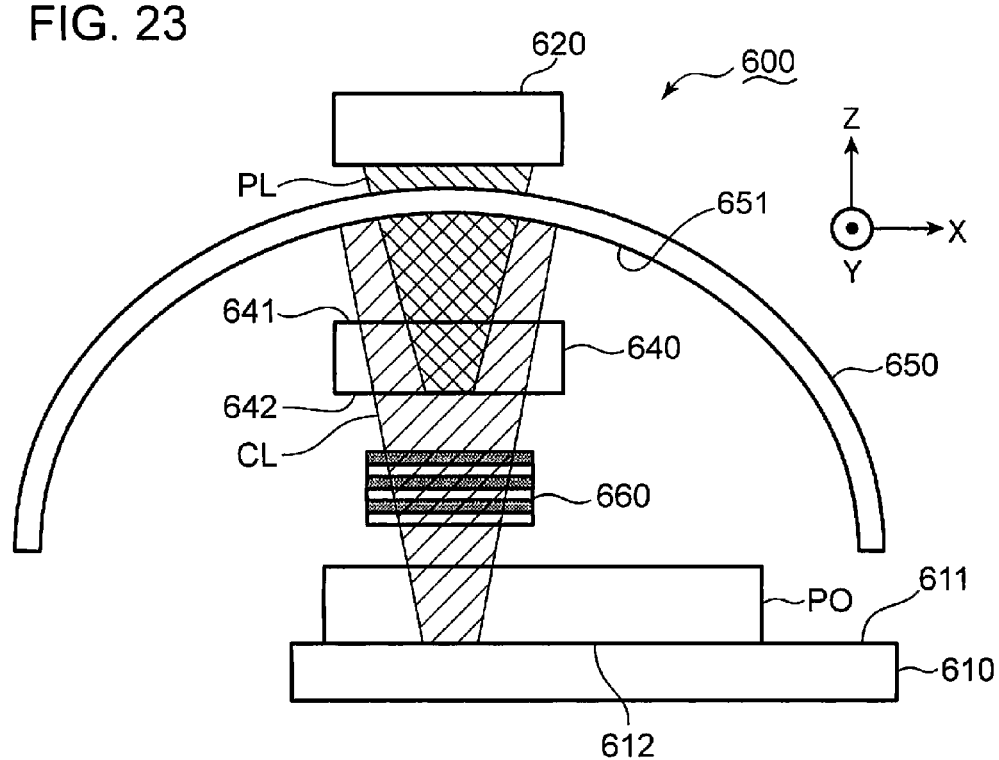
FIG. 23 is a schematic view of a laser beam machine according to the fifth embodiment.

FIG. 23 is a schematic view of a laser beam machine according to the fifth embodiment. The laser beam machine according to the fifth embodiment is described with reference to FIG. 23.

The work-piece PO which is machined by the laser beam machine 600 according to the fifth embodiment is situated inside a resonator in which the laser light oscillates. The laser oscillation is halted in synchronization with marking on the work-piece PO (shape deformation to stop farther heating the work-piece PO.

The laser beam machine 600 includes a stage 610, on which the work-piece PO is placed, and an excitation laser source 620, which is situated above the stage 610. The laser beam machine 600 also includes a solid laser crystal 640 which is situated between the stage 610 and the excitation laser source 620. The excitation laser source 620 generates and irradiates excitation light PL towards the solid laser crystal 640.

The laser beam machine 600 also includes a concave mirror 650 which is placed transversely between the solid laser crystal 640 and the excitation laser source 620. The excitation light PL from the excitation laser source 620 is incident on the solid laser crystal 640 via the concave mirror 650 to increase the energy inside the solid laser crystal 640. When the energy inside the solid laser crystal 640 exceeds a certain threshold value, resonant laser light CL is generated between the concave mirror 650 and the stage 610, due to stimulated emission. In the present embodiment, the concave mirror 650 and the stage 610 are exemplified as the resonator. The upper surface of the stage 610 and the lower surface of the concave mirror 650 are exemplified as the reflecting surface.

A part of the resonant laser light CL is absorbed by the work-piece PO. Accordingly, the optical path of the resonant laser light CL in the work-piece PO is heated, so that the work-piece PO is subjected to the markings. As a result of the markings, the work-piece PO changes in shape to disrupt resonance conditions. Consequently, generation of the resonant laser light CL is halted.

FIG. 23 shows the X, Y and Z axes which define a three-dimensional orthogonal coordinate system. The stage 610 relatively moves the work-piece PO along the XY plane with respect to the resonator which is formed by the concave mirror 650 and the stage 610. When the work-piece PO is situated at a desired position, as described above, the laser source 620 of the laser beam machine 600 causes the excitation light PL, which is incident on the solid laser crystal 640 to excite the solid laser crystal 640. Accordingly, markings are engraved at the desired position on the work-piece PO by the resonant laser light CL. In the present embodiment, the stage 610 is exemplified as the displacement mechanism.

The laser beam machine 600 according to the present embodiment may be used for laser annealing. For example, if the work-piece PO is such a material that crystallization increases absorbency for the resonant laser light CL, the laser beam machine 600 may be designed so that accumulated energy inside the solid laser crystal falls below the oscillation threshold as a loss inside the resonator increases. Accordingly, the laser beam machine 600 may be applied to laser annealing. In other words, since the oscillation of the resonant laser light CL is halted simultaneously with crystallization, the laser beam machine 600 may uniformly crystallize the entire work-piece PO.

Since the work-piece PO which is machined by the laser beam machine 600 according to the present embodiment is placed inside the resonator of the laser source, the resonant laser light CL stops oscillating simultaneously with a shape change (marking) in the optical path on the work-piece PO. Therefore, the work-piece PO is not excessively heated. Consequently, abrasion is less likely to occur.

In addition, since power of the resonant laser light CL is amplified and increased inside the resonator, a peak energy high enough to carry out laser machining such as marking or cutting is applied to the work-piece PO with a low power of the excitation light PL. In particular, if the work-piece PO is a material which does not absorb the resonant laser light CL so much, desired machining is achieved by means of a lower excitation light power than a conventional laser beam machine. Therefore, the aforementioned characteristics are advantageous.

Since laser oscillation at a high peak is limited to the inside of the resonator, the laser beam machine 600 may be excellently safe.

A semiconductor laser apparatus which oscillates laser light having a wavelength of 808 nm may be exemplified as the excitation laser source 620 for the laser beam machine 600 according to the present embodiment. Nd:YAG laser crystal may be exemplified as the solid laser crystal 640. Accordingly, the oscillated resonant laser light CL may have a wavelength of 1064 nm. The solid laser crystal may be doped with Yb, instead of Nd. Instead of YAG, another laser crystal such as YVO$_4$ may be used as the solid laser crystal.

In the present embodiment, the laser beam machine 600 including the semiconductor excitation solid laser source is described. However, the principles of the present embodiment may be similarly applied to "laser source" which uses stimulated emission inside a resonator. For instance, if a mechanism capable of moving and inserting a work-piece into a resonator of a semiconductor laser apparatus, a fiber laser apparatus or a gas laser apparatus, advantageous effects, which are similar to those of the present embodiment, are obtained.

If the work-piece does not absorb the resonant laser light so much, a solid laser apparatus or gas laser apparatus which is excited by a semiconductor laser (or other light source) described in the present embodiment is preferable. Therefore, the work-piece is machined with low power consumption, by increasing the Q value.

If the solid laser apparatus and the gas laser apparatus excited by the semiconductor laser (or other light source) described in the present embodiment are used as a light source, it may be preferable that a length of the resonator is designed to be as small as possible. Accordingly, a photon lifespan in the resonator is shortened to oscillate a short pulse laser. Therefore, laser machining may be achieved by means of two-photon absorption or alike.

In the present embodiment, a fiber laser apparatus may be used. Even if a fiber laser apparatus is used as an inexpensive laser source with a gain switching type of pulse laser oscillation, large pulse energy is obtained. In addition, since the fall time is adjusted independently of the pulse-oscillation frequency and the peak output, as described above, dot depths of the laser markings are stabilized.

As shown in FIG. 23, the laser beam machine 600 according to the present embodiment may include a wavelength conversion element 660 situated inside the resonator in which the resonant laser light CL resonates. If the laser beam machine 600 includes a wavelength conversion element 660, and if the work-piece PO does not absorb infrared light having a wavelength of approximately 1 µm so much, appropriate laser machining may be carried out. For instance, if the laser beam machine 600 has the wavelength conversion element 660, which has a similar configuration to the wavelength conversion element described in the context of the first embodiment, the resonant laser light CL is converted into the second harmonic light wave having a wavelength of 532 nm. Accordingly, the laser beam machine 600 may be suitable for markings or laser annealing on a silicon substrate. Consequently, in comparison to a laser beam machine without a wavelength conversion element, the laser beam machine 600 may machine the work-piece PO with low power consumption.

It may be preferable that a dielectric multi-layer film is formed on the concave mirror 650 and the stage 610 to prevent transmission of the second harmonic light wave. Accordingly, the laser beam machine 600 may become more compact while the work-piece PO may be machined with lower power consumption.

It may be preferable that an optical distance between the concave mirror 650 and the work-piece PO is shorter than or approximates a curvature radius of the concave mirror 650. Accordingly, positional deviation of markings, for instance, when the work-piece PO or the stage 610 is tilted, is reduced so that the markings may be formed readily at desirable positions.

It may be preferable that the optical distance between the concave mirror 650 and the work-piece PO is set to a short distance. Therefore, irregularity in the work-piece PO or the stage 610 is less likely to make an output of the resonant laser light CL unstable. Consequently, laser machining may be stabilized.

It may be preferable that the concave mirror 650 includes a concave surface 651 on which a dielectric multi-layer film is formed. The dielectric multi-layer film formed on the concave surface 651 prevents transmission of the resonant laser light CL and reflection of the excitation light PL. Therefore, the laser beam machine 600 may become more compact while the laser machining may become very efficient.

The solid laser crystal 640 includes an incident surface 641, on which the excitation light PL is incident, and an emission surface 642 opposite to the incident surface 641. It may be preferable that a dielectric multi-layer film which prevents reflection of both the resonant laser light CL and the excitation light PL is formed on the incident surface 641. It may be preferable that a dielectric multi-layer film which prevents reflection of the resonant laser light CL is formed on the emission surface 642. Accordingly, oscillation of the resonant laser light CL is stabilized to cause little abrasion.

The stage 610 includes an upper surface 611 which supports the work-piece PO. It may be preferable that a dielectric multi-layer film which increases reflectivity of the resonant laser light CL is formed on the upper surface 611. Therefore, the laser beam machine 600 may become more compact while laser machining may become more efficient.

In the present embodiment, the resonant laser light CL oscillates between the concave mirror 650 and the stage 610.

Alternatively, the resonant laser light CL may oscillate between the bottom surface 612 of the work-piece PO and the concave mirror 650.

In the present embodiment, the laser beam machine 600 includes the concave mirror 650. However, a plane mirror and a condensing lens may be used, instead of the concave mirror 650.

Figure 24:
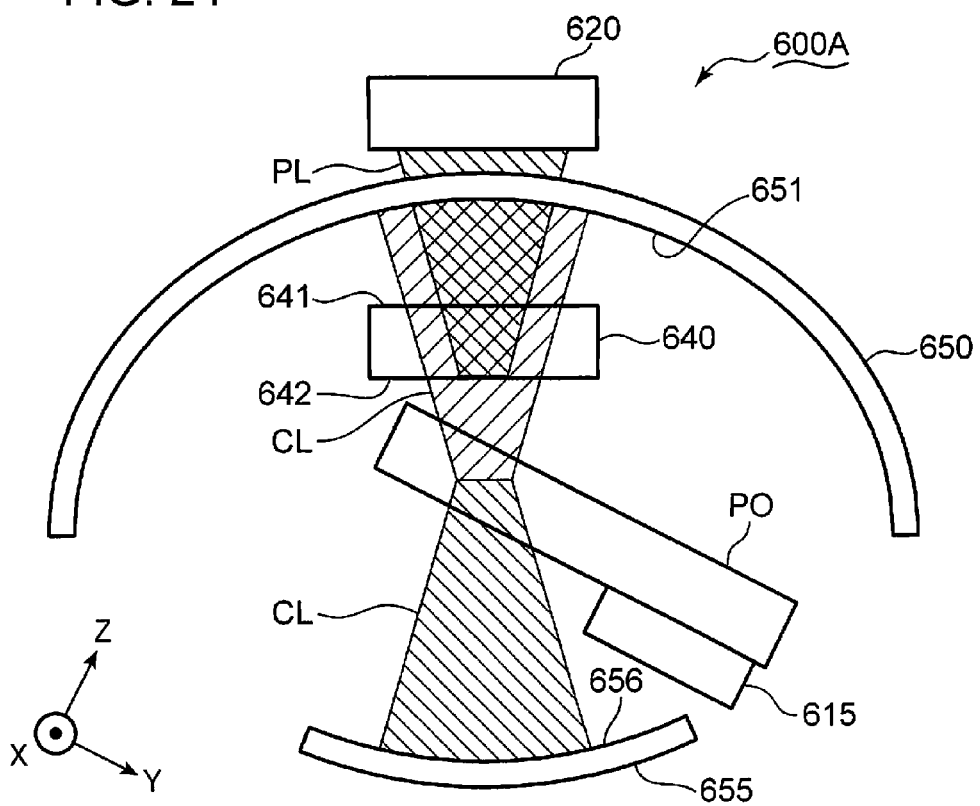
FIG. 24 is a schematic view of another laser beam machine according to principles of the fifth embodiment.

FIG. 24 shows another laser beam machine according to the principles of the present embodiment. The other laser beam machine according to the principles of the present embodiment is described with reference to FIGS. 23 and 24.

The laser beam machine 600A shown in FIG. 24 includes an additional concave mirror 655, in addition to the concave mirror 650, the excitation laser source 620 and the solid laser crystal 640, like the laser beam machine 600 described with reference to FIG. 23. The additional concave mirror 655 includes a concave surface 656 which faces the concave surface 651 of the concave mirror 650. When the excitation laser source 620 emits excitation light PL, the resonant laser light CL oscillates between the concave mirrors 650, 655. The concave mirrors 650, 655 of the laser beam machine 600A shown in FIG. 24 are exemplified as the resonator. The concave surfaces 651, 656 are exemplified as the reflecting surface.

The laser beam machine 600A includes a supporting mechanism 615 which supports the work-piece PO so that the work-piece PO lies transversely across the optical path of the resonant laser light CL. As shown in FIG. 24, the supporting mechanism 615 inclines the work-piece PO with respect to the propagation direction of the resonant laser light CL, so that the resonant laser light CL is incident at Brewster's angle.

FIG. 24 shows the X, Y and Z axes, which define a three-dimensional orthogonal coordinate system. The supporting mechanism 615 relatively moves the work-piece PO along the XY plane with respect to a resonator which is formed by the concave mirrors 650, 655. In the present embodiment, the supporting mechanism 615 is exemplified as the displacement mechanism.

Since the supporting mechanism 615 inclines the work-piece PO with respect to the propagation direction of the resonant laser light CL so that the resonant laser light CL is incident at Brewster's angle, a Q value of the resonator is increased. Therefore, the laser beam machine 600A may carry out laser machining with lower power consumption.

The stage 610 described with reference to FIG. 23 and the supporting mechanism 615 described with reference to FIG. 24 may move the work-piece PO in the Z axis direction. If the work-piece PO is moved in the Z axis direction, a beam diameter of the resonant laser light CL inside the work-piece PO is enlarged or reduced. If the laser beam machines 600, 600A carry out dot marking, the dot size is appropriately adjusted as a result of moving the work-piece PO in the Z axis direction.

Figure 25:
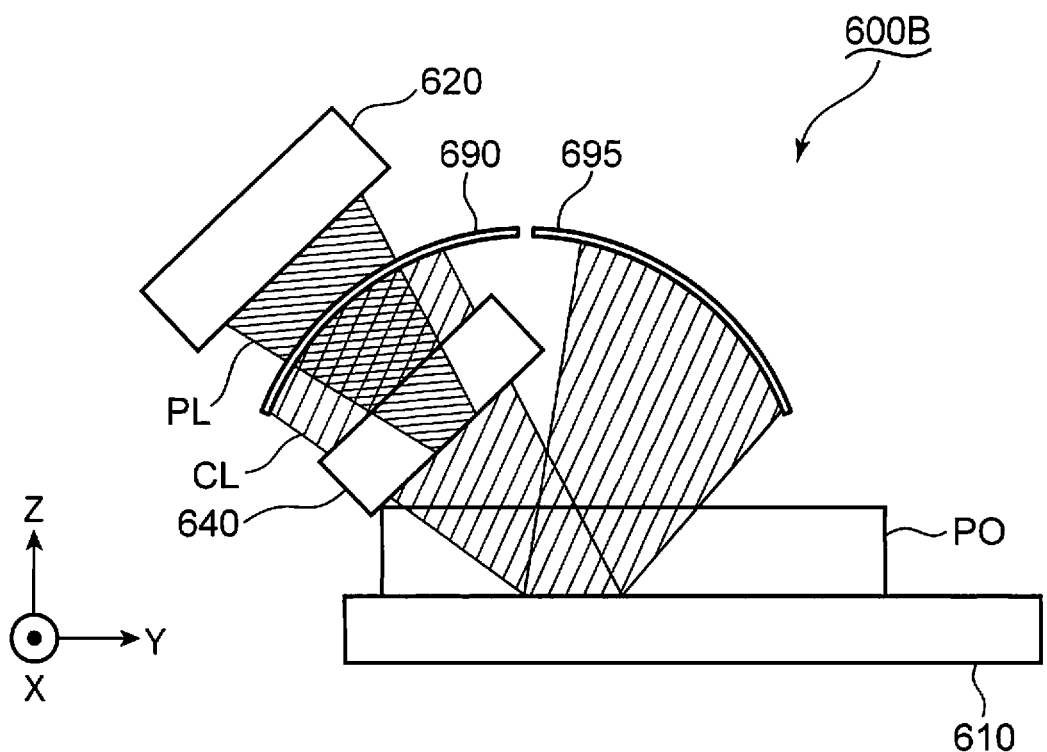
FIG. 25 is a schematic view of another laser beam machine according to the principles of the fifth embodiment.
Figure 26:
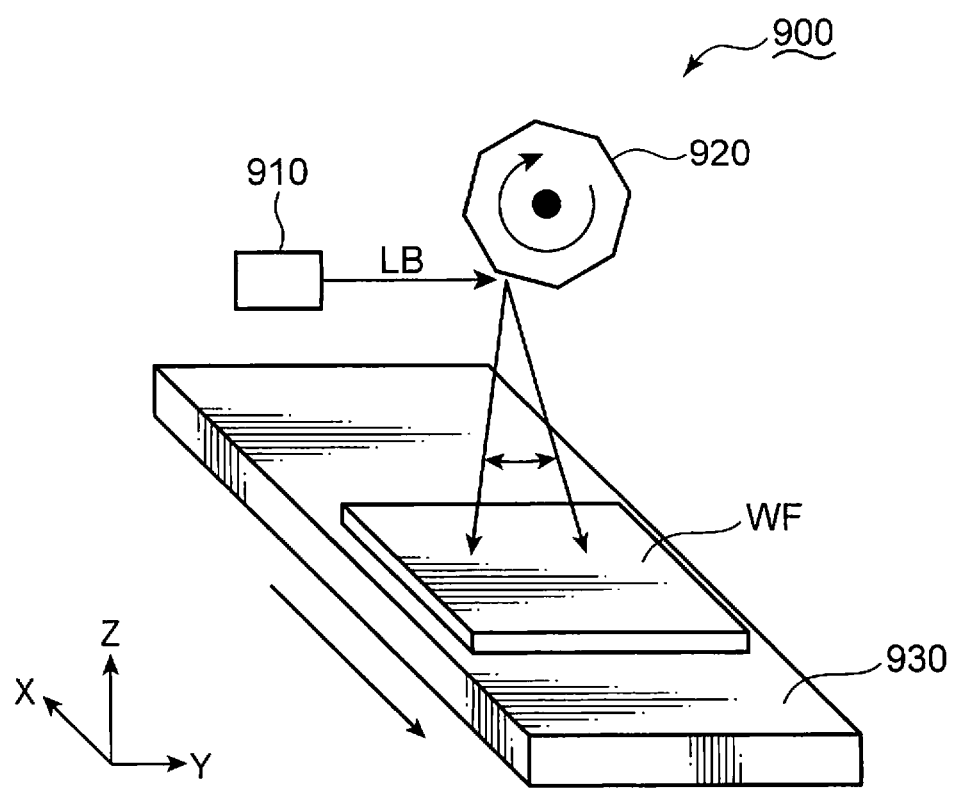
FIG. 26 is a schematic view of a conventional laser beam machine for engraving marks in a dot format.

FIG. 25 shows another laser beam machine according to the principles of the present embodiment. The other laser beam machine according to the principles of the present embodiment is described with reference to FIGS. 23 and 25.

The laser beam machine 600B shown in FIG. 25 includes a first concave mirror 690, on which the excitation light PL is incident from the excitation laser source 620, and a second concave mirror 695, which is situated adjacently to the first concave mirror 690, in addition to the stage 610, the excitation laser source 620 and the solid laser crystal 640, like the laser beam machine 600 described with reference to FIG. 23. When the excitation laser source 620 emits the excitation light PL, the resonant laser light CL oscillates among three surfaces: the stage 610, the first and second concave mirrors 690, 695. The stage 610, the first and second concave mirrors 690, 695 of the laser beam machine 600B shown in FIG. 25 are exemplified as the resonator.

It may be preferable that the first and second concave mirrors 690, 695 are situated so that the resonant laser light CL is incident on the work-piece PO on the stage 610 at Brewster's angle. Therefore, the laser beam machine 600B may carry out laser machining with lower power consumption.

It may be preferable that the laser beam machine 600 described with reference to FIG. 23 includes a Q switch (not shown) provided between the concave mirror 650 and the stage 610. It may be preferable that the laser beam machine 600B described with reference to FIG. 25 includes a Q switch (not shown) provided between the first concave mirror 690 and the stage 610. Accordingly, peak power of the resonant laser light CL inside the resonator formed in the laser beam machines 600, 600B is increased.

The principles of the laser beam machine are described in the context of a series of the aforementioned embodiments. The aforementioned configuration of the laser beam machine is merely exemplary. Therefore, various modifications may be adopted without deviating from the principles of a series of the aforementioned embodiments.

The aforementioned embodiments mainly include the following features. The laser source and the laser beam machine according to the principles of the aforementioned embodiments reduce a variance in a surface temperature rise of the work-piece during laser light irradiation. Therefore, abrasion of the work-piece is less likely to occur. Consequently, the laser source and the laser beam machine according to the principles of the aforementioned embodiments may stably carry out desirable machining processes.

The laser source for emitting laser light onto a work-piece according to one aspect of the aforementioned embodiments includes: a generator configured to generate the laser light; and an adjuster configured to adjust an output of the laser light. The adjuster situated between the generator and the work-piece reduces output density of the laser light on the work-piece.

According to the aforementioned configuration, the generator of the laser source generates laser light. Since the adjuster situated between the generator and the work-piece reduces output density of the laser light on the work-piece, an excessive temperature rise is less likely to occur on the work-piece. Consequently, abrasion is less likely to occur.

In the aforementioned configuration, the adjuster may include an NA converting portion situated on an optical path of the laser light emitted from the generator. The NA converting portion may convert an NA of the laser light in response to the output of the laser light.

According to the aforementioned configuration, the adjuster may include the NA converting portion situated on the optical path of the laser light emitted from the generator. The NA converting portion converts an NA of the laser light in response to the output of the laser light. Therefore, an excessive temperature rise is less likely to occur on the work-piece. Consequently, abrasion is less likely to occur.

In the aforementioned configuration, the generator may include a resonator with at least two reflectors, a laser medium situated inside the resonator, and an excitation element configured to excite the laser medium. The excitation element modulates energy for exciting the laser medium to cause pulse-oscillation by means of a gain switching method.

According to the aforementioned configuration, the generator may include a resonator with at least two reflectors, a laser medium situated inside the resonator, and an excitation element configured to excite the laser medium. Since the excitation element modulates energy for exciting the laser medium to cause pulse-oscillation by a gain switching method, desirable machining processes are carried out on the work-piece.

In the aforementioned configuration, the laser source may further include a wavelength convertor configured to convert a wavelength of the laser light generated by the generator. The generator may include a double-clad fiber doped with the laser medium. The wavelength convertor may shorten the wavelength of the laser light generated inside the double-clad fiber.

According to the aforementioned configuration, since the wavelength convertor shortens a wavelength of the laser light generated inside the double-clad fiber doped with the laser medium, the work-piece is machined by means of the laser light of a desirable wavelength.

In the aforementioned configuration, the laser source may further include a wavelength convertor configured to convert a wavelength of the laser light generated by the generator. The generator may generate a fundamental light wave as the laser light. The wavelength convertor may convert the fundamental light wave to converted light of a different wavelength. If an output of the fundamental light wave, which is incident on the wavelength convertor, is increased from a first output to a second output, which is higher than the first output, the adjuster may reduce a wavelength conversion efficiency of the wavelength convertor.

According to the aforementioned configuration, the wavelength convertor may convert a wavelength of the laser light generated by the generator. The generator may generate a fundamental light wave as the laser light. The wavelength convertor converts the fundamental light wave to converted light of a different wavelength. Since the adjuster may reduce wavelength conversion efficiency of the wavelength convertor if the output of the fundamental light wave incident on the wavelength convertor increases from a first output to a second output which is higher than the first output, an excessive temperature rise is less likely to occur on the work-piece. Consequently, abrasion is less likely to occur.

In the aforementioned configuration, the adjuster may include a thermal sensing portion, which measures a temperature of the wavelength convertor, a first thermal adjuster, which adjusts the temperature of the wavelength convertor, and a reducer, which reduces an output of the converted light. If the temperature of the wavelength convertor exceeds a designated threshold value associated with the temperature, the reducer may reduce the output of the converted light as the output of the fundamental light wave increases.

According to the aforementioned configuration, the adjuster may include the thermal sensing portion, which measures a temperature of the wavelength convertor; the first thermal adjuster, which adjusts the temperature of the wavelength convertor; and the reducer which reduces an output of the converted light. Since the reducer reduces the output of the converted light as the output of the fundamental light wave increases if the temperature of the wavelength convertor exceeds a designated threshold value associated with the temperature, an excessive temperature rise is less likely to occur on the work-piece. Consequently, abrasion is less likely to occur.

In the aforementioned configuration, the reducer may give the wavelength converter output characteristics under which the output of the converted light increases as the output of the fundamental light wave increases if the temperature of the wavelength convertor is in a first temperature range whereas the output of the converted light decreases as the output of the fundamental light wave increases if the temperature of the wavelength convertor is in a second temperature range which is different from the first temperature range. The first thermal adjuster may set the temperature of the wavelength convertor to a temperature between the first and second temperature ranges.

According to the aforementioned configuration, the output of the converted light may be increased as the output of the fundamental light wave increases if the temperature of the wavelength convertor is in the first temperature range in accordance with the output characteristics which the adjuster gives the wavelength convertor. If the temperature of the wavelength convertor is in the second temperature range which is different from the first temperature range, the output of the converted light may be reduced as the output of the fundamental light wave increases. Since the first thermal adjuster sets the temperature of the wavelength convertor to a temperature between the first and second temperature ranges, a resultant variance in the output of the converted light from a variation in the output of the fundamental light wave is reduced.

In the aforementioned configuration, the NA converting portion may cause a thermal lens effect by means of the laser light emitted from the generator.

According to the aforementioned configuration, since the NA converting portion causes a thermal lens effect by means of the laser light emitted from the generator, an excessive temperature rise is less likely to occur on the work-piece. Consequently, abrasion is less likely to occur.

In the aforementioned configuration, the laser source may further include a second thermal adjuster configured to adjust a temperature of the NA converting portion. The NA converting portion is a non-linear optical crystal formed mainly of $LiTaO_3$ or $LiNbO_3$.

According to the aforementioned configuration, the laser source may further include a second thermal adjuster configured to adjust a temperature of the NA converting portion. Since the NA converting portion is a non-linear optical crystal containing $LiTaO_3$ or $LiNbO_3$, a thermal lens effect is obtained in a range from ultraviolet to infrared light. Therefore, the laser source may be inexpensively manufactured.

The laser beam machine according to another aspect of the aforementioned embodiments includes the aforementioned laser source; a scanning optical system which moves an irradiation position of the laser light emitted from the laser source to scan a surface of the work-piece; and a stage on which the work-piece is placed. The stage moves the work-piece. The laser source causes pulse-oscillation.

According to the aforementioned configuration, the scanning optical system moves an irradiation position of the laser light emitted from the aforementioned laser source to scan a surface of the work-piece. The stage on which the work-piece is placed moves the work-piece. Since the laser source causes pulse oscillation, desirable laser machining processes are carried out on the work-piece with little abrasion.

The laser beam machine according to yet another aspect of the aforementioned embodiments includes: the aforementioned laser source; a smoothing element configured to make a light intensity distribution smooth in a perpendicular plane to a propagation direction of the laser light emitted from the laser source; a spatial modulator configured to change the light intensity distribution in the perpendicular plane; and an optical system configured to guide the laser light, which has the light intensity distribution changed by the spatial modulator, to the work-piece. The laser source causes pulse-oscillation.

According to the aforementioned configuration, the smoothing element makes the light intensity distribution smooth in the perpendicular plane to the propagation direction of the laser light emitted from the aforementioned laser source. The spatial modulator changes the light intensity distribution in the perpendicular plane. The optical system guides laser light, which has the light intensity distribution changed by the spatial modulator, to the work-piece. Since the laser source causes pulse-oscillation, desirable laser machining processes are carried out on the work-piece with little abrasion.

The laser beam machine according to yet another aspect of the aforementioned embodiments includes: the aforementioned laser source; a smoothing element configured to make a light intensity distribution smooth in a perpendicular plane to a propagation direction of the laser light emitted from the laser source; a spatial modulator configured to change the light intensity distribution in the perpendicular plane; an optical system configured to guide the laser light, which has the light intensity distribution changed by the spatial modulator, to the work-piece; and an aperture element on which an aperture is formed. The laser source causes pulse-oscillation. The aperture element is situated between the laser source and the smoothing element.

According to the aforementioned configuration, the smoothing element makes the light intensity distribution smooth in the perpendicular plane to the propagation direction of the laser light emitted from the aforementioned laser source. The spatial modulator changes the light intensity distribution in the perpendicular plane. The optical system guides laser light, which has the light intensity distribution changed by the spatial modulator, to the work-piece. Since the aperture element, on which an aperture is formed, is situated between the laser source, which causes pulse-oscillation, and the smoothing element, an output variance of the laser light is reduced.

In the aforementioned configuration, the work-piece may be silicon. The laser light may be visible light having a wavelength of no less than 520 nm and no more than 560 nm; and the adjuster may adjust the output density of the laser light on a work surface of the work-piece to no more than $8.0 \times 10^7$ W/cm$^2$.

According to the aforementioned configuration, the work-piece may be silicon. The laser light may be visible light having a wavelength of no less than 520 nm and no more than 560 nm. Since the adjuster adjusts the output density of the laser light on the work surface of the work-piece to no more than $8.0 \times 10^7$ W/cm$^2$, laser machining processes for the silicon are appropriately carried out with little abrasion.

In the aforementioned configuration, a fall time during which the output of the laser light falls from a maximum value to 10% of the maximum value may be no less than 80 ns.

According to the aforementioned configuration, the fall time during which the output of the laser light falls from a maximum value to 10% of the maximum value may be no less than 80 ns. Therefore, well-visible markings may be made on the work surface.

The laser beam machine for machining a work-piece by means of laser light according to yet another aspect of the aforementioned embodiments includes: a resonator with at least two reflecting surfaces; a laser crystal configured to cause laser oscillation by means of stimulated emission; and a displacement mechanism configured to relatively displace the work-piece situated inside the resonator with respect to the resonator.

According to the aforementioned configuration, the laser beam machine machines the work-piece by means of laser light from a laser crystal which generates laser light by means of stimulated emission. Since the displacement mechanism relatively displaces the work-piece situated inside the resonator with respect to the resonator, the work-piece is safely machined.

In the aforementioned configuration, the work-piece may be placed obliquely with respect to the optical path of the laser light so that the laser light is incident on the work-piece at Brewster's angle.

According to the aforementioned configuration, since the work-piece is placed obliquely with respect to the optical path of the laser light so that the laser light is incident on the work-piece at Brewster's angle, it requires less power to machine the work-piece.

INDUSTRIAL APPLICABILITY

The principles of the aforementioned embodiments provide a laser source and a laser machining apparatus incorporating the laser source which cause little abrasion and achieve desirable machining processes. The principles of the aforementioned embodiments may be applied to various machining apparatuses such as an apparatus, which carries out dot marking to achieve stable visibility, or a laser annealing apparatus.

The invention claimed is:

1. A laser source for emitting laser light onto a work-piece, comprising:
a generator configured to generate the laser light; and
an adjuster configured to adjust an output of the laser light, wherein
the adjuster situated between the generator and the work-piece reduces output density of the laser light on the work-piece, the adjuster including an NA converting portion situated in an optical path of the laser light emitted from the generator,
the NA converting portion converts an NA of the laser light in response to the output of the laser light, and changes a beam diameter over time in response to a pulse waveform within one pulse of the laser light.

2. The laser source according to claim 1, wherein a non-linear optical crystal is used as the NA converter.

3. The laser source according to claim 1, wherein
the generator includes a resonator with at least two reflectors, a laser medium situated inside the resonator, and an excitation element configured to excite the laser medium; and
the excitation element modulates energy for exciting the laser medium to cause pulse-oscillation by means of a gain switching method.

4. The laser source according to claim 1, further comprising a wavelength convertor configured to convert a wavelength of the laser light generated by the generator, wherein
the generator includes a double-clad fiber doped with the laser medium; and
the wavelength convertor shortens the wavelength of the laser light generated inside the double-clad fiber.

5. A laser source for emitting laser light onto a work-piece, comprising:
a generator configured to generate a fundamental light wave as the laser light; and
a wavelength convertor configured to convert the fundamental light to converted light of a different wavelength; and
a thermal sensing portion configured to measure a temperature of the wavelength convertor, a first thermal adjuster configured to adjust a temperature of the wavelength convertor, and a thermal insulator configured to reduce an output of the converted light, wherein the wavelength convertor reduces a wavelength conversion efficiency if an output of the fundamental light wave incident on the wavelength convertor is increased from a first output to a second output which is higher than the first output, the thermal insulator reduces the output of the converted light as the output of the fundamental light wave increases if the temperature of the wavelength convertor exceeds a designated threshold value associated with the temperature, and gives the wavelength converter output characteristics under which the output of the converted light increases as the output of the fundamental light wave increases if the temperature of the wavelength convertor is in a first temperature range whereas the output of the converted light decreases as the output of the fundamental light wave increases if the temperature of the wavelength convertor is in a second temperature range which is different from the first temperature range, and the first thermal adjuster sets the temperature of the wavelength convertor to a temperature between the first and second temperature ranges.

6. The laser source according to claim 1, wherein the NA converting portion causes a thermal lens effect by means of the laser light emitted from the generator.

7. The laser source according to claim 2, further comprising a second thermal adjuster configured to adjust a temperature of the NA converting portion, wherein the non-linear optical crystal is formed mainly of $LiTaO_3$ or $LiNbO_3$.

8. The laser source according to claim 2, further comprising an ultraviolet light source configured to irradiate ultraviolet light onto the NA converting portion, wherein the non-linear optical crystal is formed mainly of $LiNbO_3$; and a wavelength of the ultraviolet light is no more than 380 nm.

9. A laser beam machine, comprising:

the laser source according to claim 1;

a scanning optical system which moves an irradiation position of the laser light emitted from the laser source to scan a surface of the work-piece; and a stage on which the work-piece is placed, the stage moving the work-piece, wherein the laser source causes pulse-oscillation.

10. A laser beam machine, comprising:

the laser source according to claim 1;

a smoothing element configured to make a light intensity distribution smooth in a plane perpendicular to a direction of propagation of the laser light emitted from the laser source;

a spatial modulator configured to change the light intensity distribution in the perpendicular plane; and an optical system configured to guide the laser light, which has the light intensity distribution changed by the spatial modulator, to the work-piece, wherein the laser source causes pulse-oscillation.

11. A laser beam machine, comprising:

the laser source according to claim 1;

a smoothing element configured to make a light intensity distribution smooth in a perpendicular plane to a propagation direction of the laser light emitted from the laser source;

a spatial modulator configured to change the light intensity distribution in the perpendicular plane; and an optical system configured to guide the laser light, which has the light intensity distribution changed by the spatial modulator, to the work-piece;

an aperture element on which an aperture is formed, wherein the laser source causes pulse-oscillation; and the aperture element is situated between the laser source and the smoothing element.

12. The laser beam machine according to claim 9, wherein the work-piece is silicon;

the laser light is visible light having a wavelength of no less than 520 nm and no more than 560 nm; and the adjuster adjusts the output density of the laser light on the work surface of the work-piece to no more than $8.0 \times 10^7$ W/cm$^2$.

13. The laser beam machine according to claim 9, wherein a fall time during which the output of the laser light falls from a maximum value to 10% of the maximum value is no less than 80 ns.

14. A laser beam machine for machining a work-piece by means of laser light, comprising:

a resonator with at least two reflecting surfaces;

a laser crystal configured to cause laser oscillation by means of stimulated emission; and a displacement mechanism configured to relatively displace the work-piece situated inside the resonator with respect to the resonator, wherein the work-piece is placed obliquely with respect to the optical path of the laser light so that the laser light is incident on the work-piece at Brewster's angle.

* * * * *